US012580769B2

(12) United States Patent　　　　　(10) Patent No.:　US 12,580,769 B2

Mukherjee et al.　　　　　　　　　(45) Date of Patent:　　Mar. 17, 2026

(54) ROUND OPTIMAL OBLIVIOUS TRANSFERS FROM ISOGENIES

(71) Applicant: VISA INTERNATIONAL SERVICE ASSOCIATION, San Francisco, CA (US)

(72) Inventors: Pratyay Mukherjee, Sunnyvale, CA (US); Pratik Sarkar, San Francisco, CA (US); Sikhar Patranabis, San Francisco, CA (US); Srinivasan Raghuraman, Cambridge, MA (US); Daniel Masny, Sunnyvale, CA (US); Saikrishna Badrinarayanan, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 4 days.

(21) Appl. No.: 18/696,841

(22) PCT Filed: Sep. 16, 2022

(86) PCT No.: PCT/US2022/043840

§ 371 (c)(1),
(2) Date: Mar. 28, 2024

(87) PCT Pub. No.: WO2023/055582

PCT Pub. Date: Apr. 6, 2023

(65) Prior Publication Data

US 2024/0396735 A1　　　Nov. 28, 2024

Related U.S. Application Data

(60) Provisional application No. 63/250,408, filed on Sep. 30, 2021.

(51) Int. Cl.
*H04L 9/14*　　　　　(2006.01)
*G06F 21/62*　　　　(2013.01)
(Continued)

(52) U.S. Cl.
CPC .......... *H04L 9/3236* (2013.01); *H04L 9/3066* (2013.01); *H04L 9/3221* (2013.01)

(58) Field of Classification Search
None
See application file for complete search history.

(56) References Cited

U.S. PATENT DOCUMENTS 8,977,855 B2　　3/2015　Kolesnikov
10,880,278 B1 *　12/2020　de Quehen ........... H04L 9/0838
(Continued)

FOREIGN PATENT DOCUMENTS

EP　　　　3590224 B1 *　7/2020　........... H04L 9/3073

OTHER PUBLICATIONS

Novel One Time Signatures (NOTS): A Compact Post-Quantum Digital Signature Scheme. Shahid et al. IEEE. (Year: 2020).*
(Continued)

*Primary Examiner* — Venkat Perungavoor

(74) *Attorney, Agent, or Firm* — Kilpatrick Townsend & Stockton LLP

(57) ABSTRACT

Conducting secure transfers between computing devices can pose a challenge. Therefore, an oblivious transfer can be used to conduct a secure transfer. The oblivious transfer (OT) is an interactive protocol between two parties: a sender computing device and a receiver computing device. An OT protocol involves the sender computing device holding two messages m0 and m1, and the receiver computing device holding a bit b? {0, 1}. At the end of the protocol, the receiver computing device should only learn the message mb and nothing about the other message m1?b, while the sender computing device should learn nothing about the bit b. With the steady progress in quantum computing, several post-quantum oblivious transfer protocols can be derived.

18 Claims, 10 Drawing Sheets

(51) Int. Cl.
H04L 9/30 (2006.01)
H04L 9/32 (2006.01)
*G06F 21/60* (2013.01)

(56) References Cited

U.S. PATENT DOCUMENTS

| | | | | |
|---|---|---|---|---|
| 11,728,988 | B2 * | 8/2023 | Garcia Morchon | .. H04L 9/0841 380/44 |
| 2005/0094806 | A1 | 5/2005 | Jao et al. | |
| 2019/0050541 | A1 | 2/2019 | Wright et al. | |
| 2020/0090552 | A1 | 3/2020 | Feng et al. | |
| 2021/0075610 | A1 | 3/2021 | Covaci et al. | |
| 2021/0135870 | A1 | 5/2021 | Uy et al. | |
| 2022/0067127 | A1 * | 3/2022 | Covolato | ................ G06F 21/44 |

OTHER PUBLICATIONS

On the Bounded Distance Decoding Problem for Lattices Constructed and Their Cryptographic Applications. Li et al. IEEE. (Year: 2020).*

Alamati et al., "Cryptographic Group Actions and Applications", International Conference on the Theory and Application of Cryptology and Information Security, Advances in Cryptology—ASIACRYPT 2020, Dec. 5, 2020, pp. 411-439.

Application No. PCT/US2022/043840 , International Search Report and the Written Opinion, Mailed On Jan. 18, 2023, 11 pages.

Kundu, et al., "1-out-of-2: post quantum oblivious transfer protocols based on multivariate public key cryptography", Department of Mathematics, The LNM Institute of Information Technology, Jaipur 302031, India, Aug. 19, 2020. 12 pages.

Blazy, et al., "Post-Quantum UC-Secure Oblivious Transfer in the Standard Model with Adaptive Corruptions", Universite de Limoges, XLIM, Limoges, France. Olivier.blazy@unilim.fr, 26 pages.

Barreto, et al., Supersingular Isogeny Oblivious Transfe (SIOT), arXiv::1805.06589v2 [cs.CR], Jan. 12, 2021, 23 pgs . . . Cryptology ePrint Archive, Report 2018/459, 2018, https://eprint.iacr.org/2018/459.

Cyprien Delpech De Saint Guilhem, et al.; Semi-Commutative Masking: A Framework for Isogeny-Based Protocols, with an Application to Fully Secure Two-Round Isogeny-Based OT, imec COSIC,Ku Leuven, Belgium, 36 pages.

Vitse, Simple Oblivious Transfer Protocols Compatible with Kummer and Supersingular Isogenies, University Grenoble Alpes, CNRS, Insitiut Fourier, f-3800, Grenoble, France, 31 pages.

Alamati, et al., Cryptographic Group Actions and Applications, University of Michigan, 32 pages.

Lai, et al., Compact, Efficient and UC-Secure Isogeny-Based Oblivious Transfer, University of Auckland, New Zealand, 32 pages.

* cited by examiner

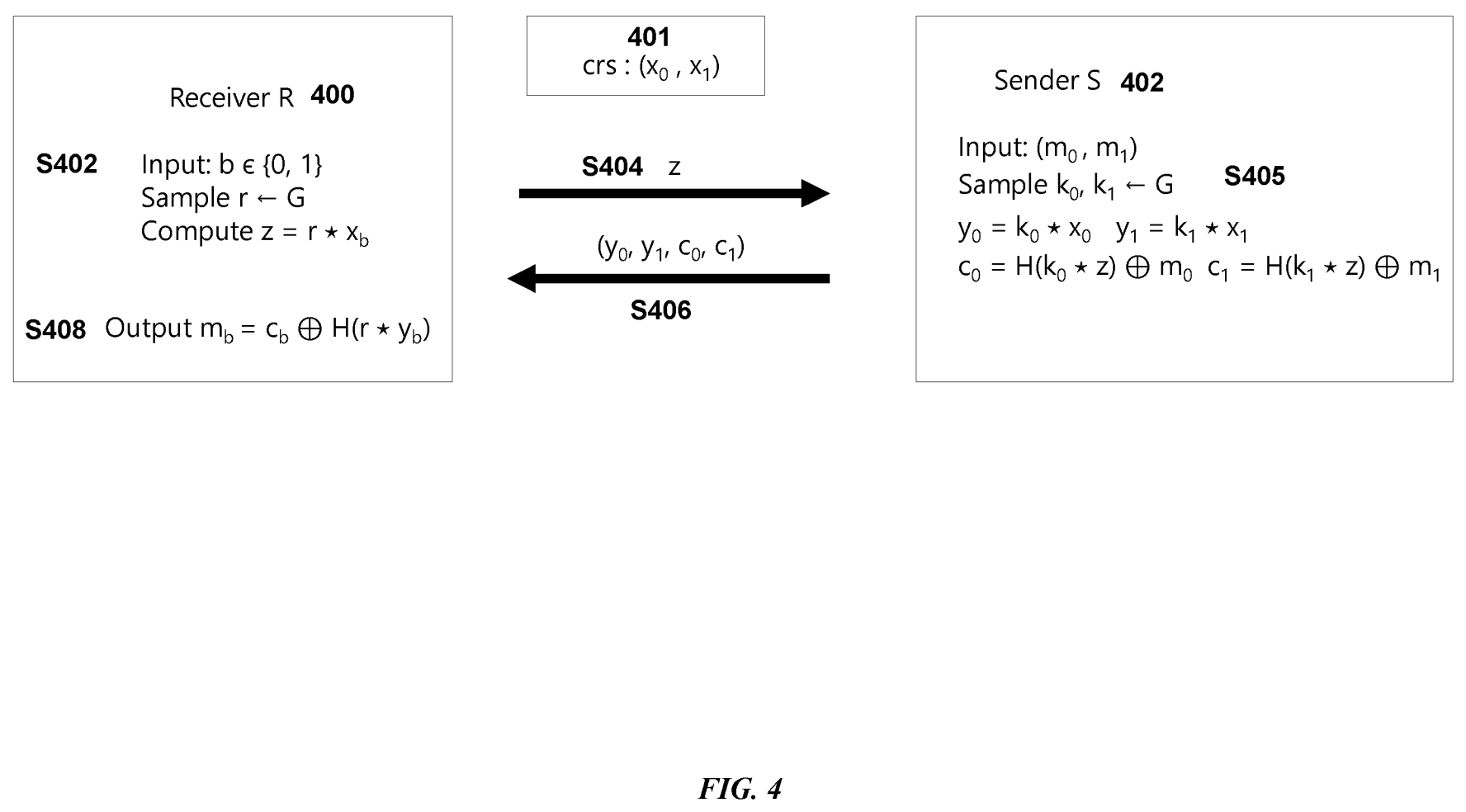

Sender S 402

Input: $(m_0, m_1)$
Sample $k_0, k_1 \leftarrow G$     S405

$y_0 = k_0 \star x_0 \quad y_1 = k_1 \star x_1$
$c_0 = H(k_0 \star z) \oplus m_0 \quad c_1 = H(k_1 \star z) \oplus m_1$

401
crs : $(x_0, x_1)$

S404   z $(y_0, y_1, c_0, c_1)$

S406

Receiver R 400

S402    Input: $b \in \{0, 1\}$
Sample $r \leftarrow G$
Compute $z = r \star x_b$

S408   Output $m_b = c_b \oplus H(r \star y_b)$

*FIG. 4*

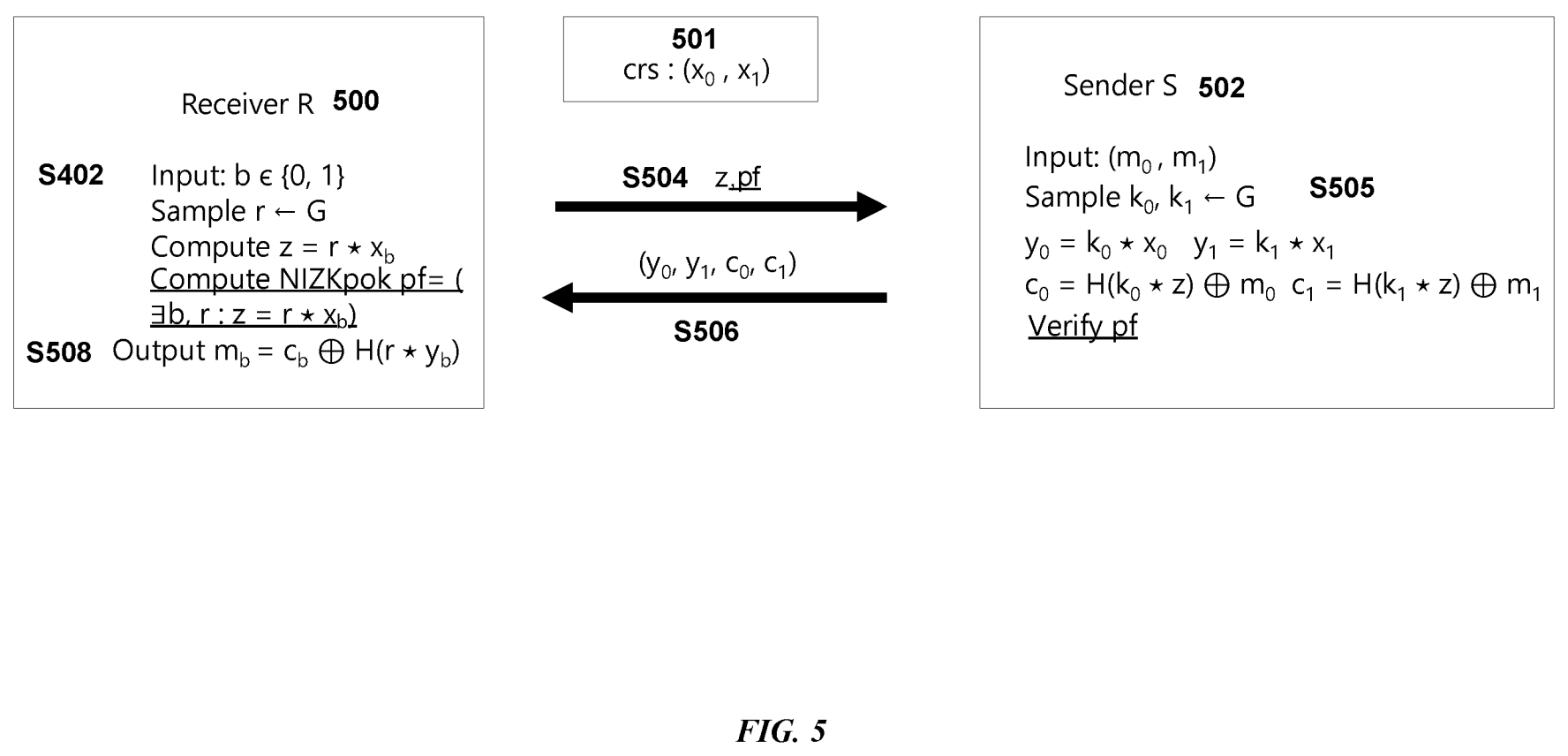

Sender S 502

Input: $(m_0, m_1)$
Sample $k_0, k_1 \leftarrow G$    S505
$y_0 = k_0 \star x_0$    $y_1 = k_1 \star x_1$
$c_0 = H(k_0 \star z) \oplus m_0$    $c_1 = H(k_1 \star z) \oplus m_1$
<u>Verify pf</u>

501
crs : $(x_0, x_1)$

S504   z, pf $(y_0, y_1, c_0, c_1)$

S506

Receiver R 500

S402    Input: $b \in \{0, 1\}$
Sample $r \leftarrow G$
Compute $z = r \star x_b$
<u>Compute NIZKpok pf = (</u>
<u>$\exists b, r : z = r \star x_b$)</u>

S508   Output $m_b = c_b \oplus H(r \star y_b)$

*FIG. 5*

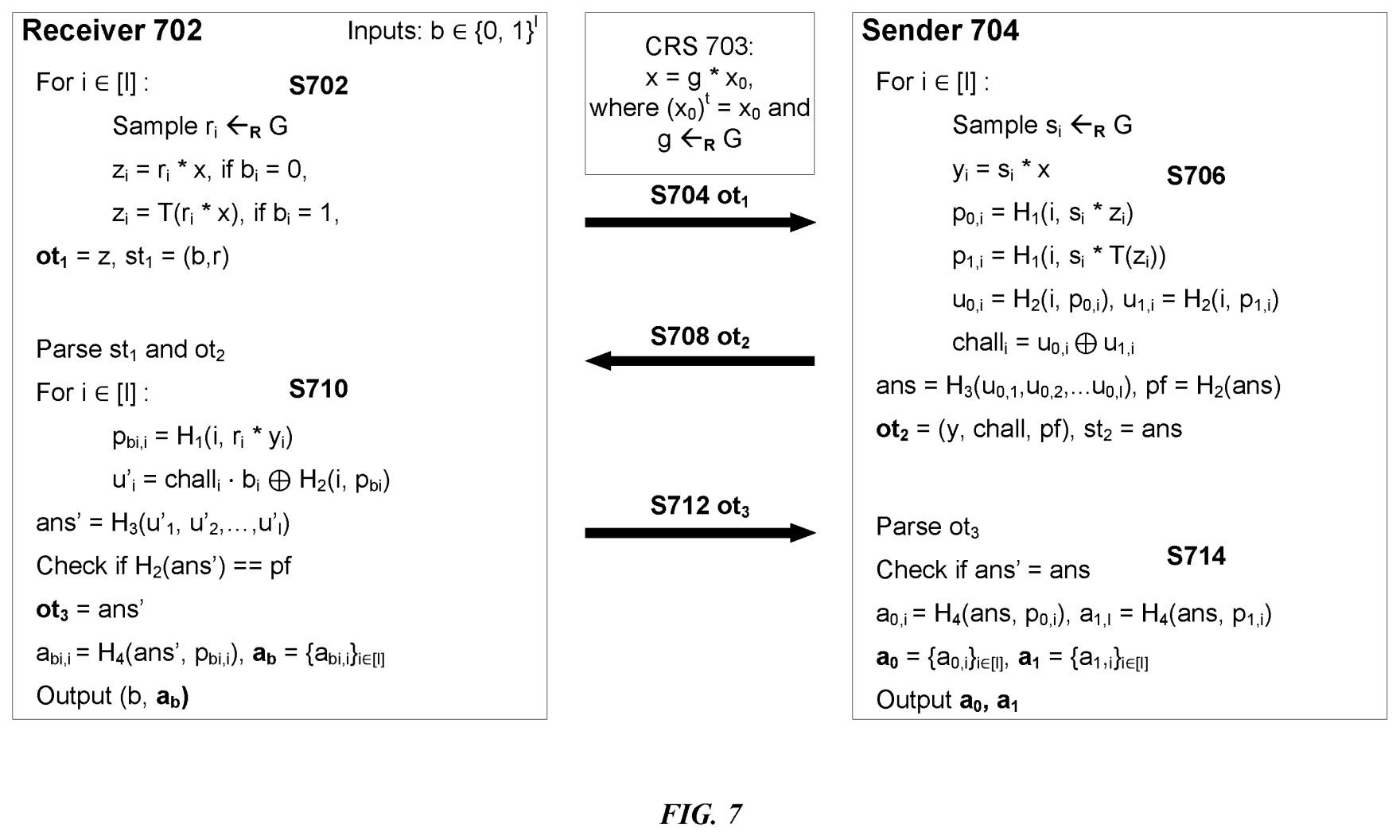

Sender 704

For $i \in [l]$:

Sample $s_i \leftarrow_R G$      S706

$y_i = s_i * x$ $p_{0,i} = H_1(i, s_i * z_i)$ $p_{1,i} = H_1(i, s_i * T(z_i))$ $u_{0,i} = H_2(i, p_{0,i})$, $u_{1,i} = H_2(i, p_{1,i})$ $chall_i = u_{0,i} \oplus u_{1,i}$ ans $= H_3(u_{0,1}, u_{0,2}, \ldots u_{0,l})$, pf $= H_2(ans)$ $\mathbf{ot_2} = (y, chall, pf)$, $st_2 = ans$ Parse $ot_3$ Check if ans' $=$ ans      S714

$a_{0,i} = H_4(ans, p_{0,i})$, $a_{1,i} = H_4(ans, p_{1,i})$ $\mathbf{a_0} = \{a_{0,i}\}_{i\in[l]}$, $\mathbf{a_1} = \{a_{1,i}\}_{i\in[l]}$ Output $\mathbf{a_0}$, $\mathbf{a_1}$

---

CRS 703:
$x = g * x_0$,
where $(x_0)^t = x_0$ and
$g \leftarrow_R G$

S704 $ot_1$

S708 $ot_2$

S712 $ot_3$

---

Receiver 702

Inputs: $b \in \{0, 1\}^l$

For $i \in [l]$:      S702

Sample $r_i \leftarrow_R G$ $z_i = r_i * x$, if $b_i = 0$, $z_i = T(r_i * x)$, if $b_i = 1$, $\mathbf{ot_1} = z$, $st_1 = (b, r)$ Parse $st_1$ and $ot_2$ For $i \in [l]$:      S710

$p_{bi,i} = H_1(i, r_i * y_i)$ $u'_i = chall_i \cdot b_i \oplus H_2(i, p_{bi})$ ans' $= H_3(u'_1, u'_2, \ldots, u'_l)$ Check if $H_2(ans') == pf$ $\mathbf{ot_3} = ans'$ $a_{bi,i} = H_4(ans', p_{bi,i})$, $\mathbf{a_b} = \{a_{bi,i}\}_{i\in[l]}$ Output $(b, \mathbf{a_b})$

*FIG. 7*

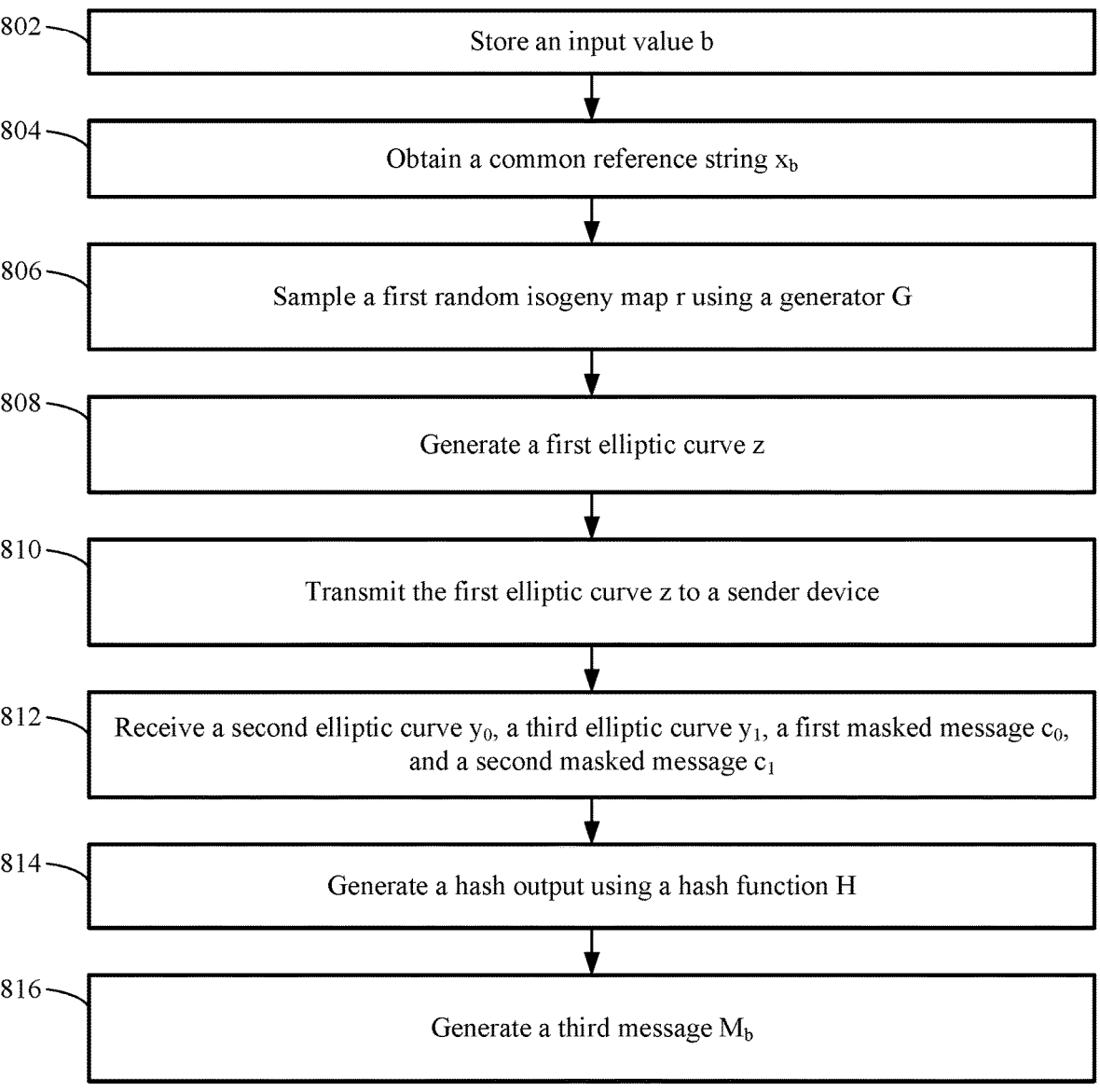

802 — Store an input value b

804 — Obtain a common reference string $x_b$

806 — Sample a first random isogeny map r using a generator G

808 — Generate a first elliptic curve z

810 — Transmit the first elliptic curve z to a sender device

812 — Receive a second elliptic curve $y_0$, a third elliptic curve $y_1$, a first masked message $c_0$, and a second masked message $c_1$ 814 — Generate a hash output using a hash function H 816 — Generate a third message $M_b$

*FIG. 8*

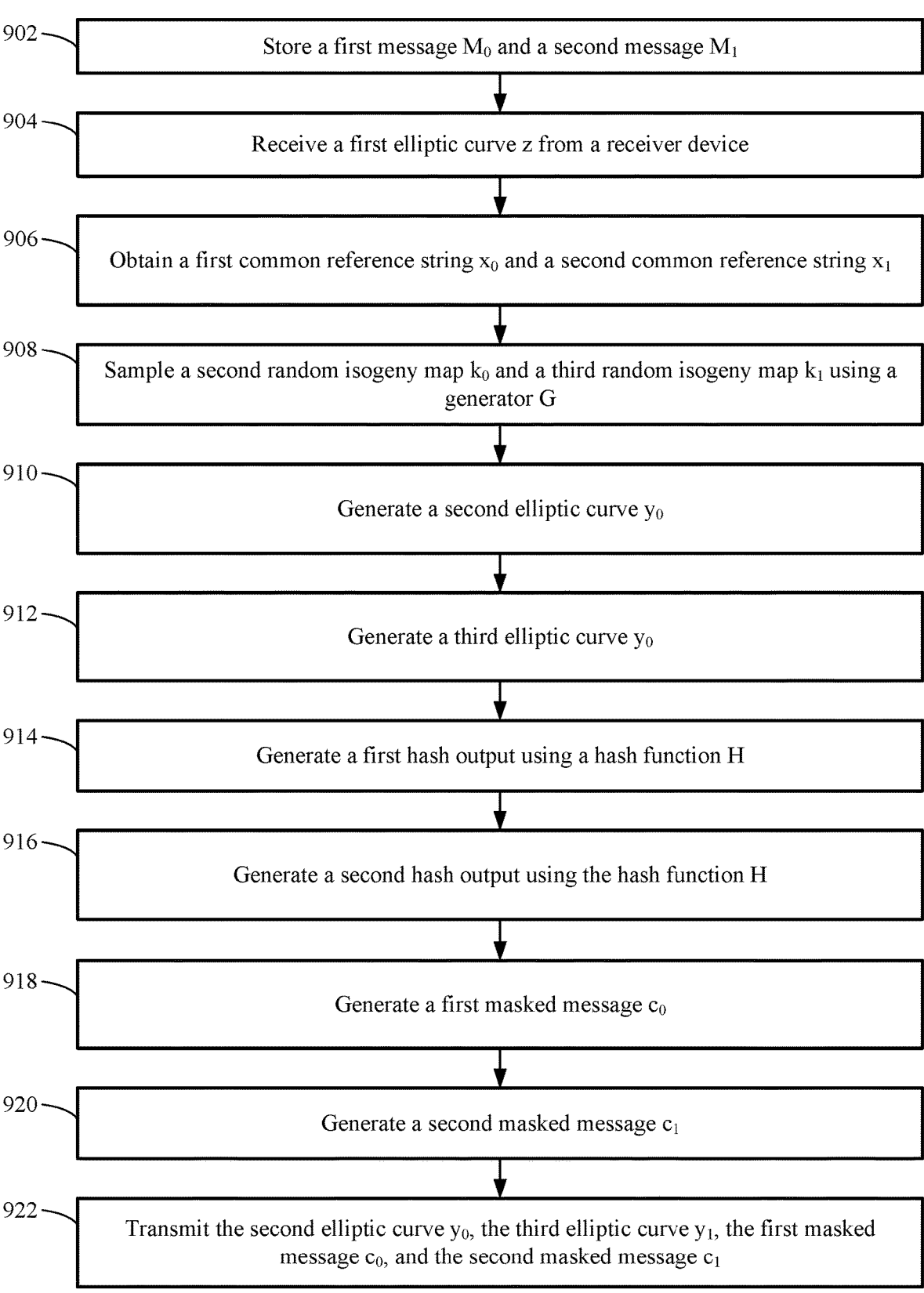

902 — Store a first message $M_0$ and a second message $M_1$

904 — Receive a first elliptic curve z from a receiver device

906 — Obtain a first common reference string $x_0$ and a second common reference string $x_1$ 908 — Sample a second random isogeny map $k_0$ and a third random isogeny map $k_1$ using a generator G 910 — Generate a second elliptic curve $y_0$ 912 — Generate a third elliptic curve $y_0$ 914 — Generate a first hash output using a hash function H 916 — Generate a second hash output using the hash function H 918 — Generate a first masked message $c_0$ 920 — Generate a second masked message $c_1$ 922 — Transmit the second elliptic curve $y_0$, the third elliptic curve $y_1$, the first masked message $c_0$, and the second masked message $c_1$

*FIG. 9*

ROUND OPTIMAL OBLIVIOUS TRANSFERS FROM ISOGENIES

CROSS-REFERENCES TO RELATED APPLICATIONS

This application is a 371 application of International Application No. PCT/US2022/043840, filed Sep. 16, 2022, which claims the benefit of U.S. Provisional Application No. 63/250,408, filed Sep. 30, 2021, which is herein incorporated by reference in its entirety for all purposes.

TECHNICAL FIELD

The present disclosure relates generally to secure transfers between computing devices. More specifically, but not by way of limitation, this disclosure relates to performing multiple-party computations that are secure.

BACKGROUND

In general secure multi-party computation can be described as a joint computation between multiple parties, in which each party has some sensitive data and in the end every party learns the outcome of the computation, but nothing about the sensitive data of the other parties. Oblivious Transfer is an important building block for accomplishing secure multi-party computation.

Ensuring secure joint computation between computing devices continues to be a concern. For instance, a first party may wish to utilize data from a second party that is willing to provide some data, but unwilling to divulge information about the size and content of the overall data pool. If intercepted, the data could be used to obtain information about the data pools of the computing devices or used for illicit purposes. However, enabling a sender and receiver to share data without providing either party with information about the specific data being shared at any given point in time, can be problematic because some information about data being requested may be needed in order to fulfill a request. Conducting secure transfers between computing devices can pose a challenge.

Aspects of the present invention address these and other problems individually and collectively.

BRIEF SUMMARY

One embodiment of the disclosure can include a method for performing a privacy-preserving multi-party computation. The method can be performed by a receiver device. The receiver device can store an input value, obtain a common reference string $x_b$, and sample a first random isogeny map r using a generator G. The receiver device can also generate a first elliptic curve z using the first random isogeny map r and the common reference string $x_b$. The receiver device can then transmit the first elliptic curve z to a sender device. The receiver device can receive, from the sender device, a second elliptic curve $y_0$, a third elliptic curve $y_1$, a first masked message $c_0$, and a second masked message $c_1$, wherein the first masked message $c_0$ can be generated using a first message $m_0$, and wherein the second masked message $c_0$ can be generated using a second message $m_1$. The receiver device can generate a hash output using a hash function H that operates on a combined value of the first random isogeny map r and a fourth elliptic curve $y_b$, wherein the fourth elliptic curve $y_b$ can be either the second elliptic curve $y_0$ or the third elliptic curve $y_1$ depending on the input value b. The receiver device can then generate a third message $M_b$ by combining a third masked message $c_b$ with the hash output using an invertible function, wherein the third message $m_b$ can be either the first masked message $m_0$ or the second masked message $m_1$ depending on the input value b, and wherein third masked message $c_b$ can be either the first masked message $c_0$ or the second masked message $c_1$ depending on the input value b.

Another embodiment of the disclosure can include a method for performing a privacy-preserving multi-party computation. The method can be performed by a sender device. The sender device can store a first message $m_0$ and a second message $m_1$. The sender device can receive, from a receiver device, a first elliptic curve z that was generated using a first random isogeny map r. The sender device can obtain a first common reference string $x_0$ and a second common reference string $x_1$. The sender device can sample a second random isogeny map $k_0$ and a third random isogeny map $k_1$ using a generator G, generate a second elliptic curve $y_0$ using the second random isogeny map $k_0$ and the first common reference string $x_0$, and generate a third elliptic curve $y_1$ using the third random isogeny map $k_1$ and the second common reference string $x_1$. The sender device can also generate a first hash output using a hash function H that operates on a first combined value of the second random isogeny map $k_0$ and the first elliptic curve z, and generate a second hash output using the hash function H that operates on a second combined value of the third random isogeny map $k_1$ and the first elliptic curve z. The sender device can then generate a first masked message $c_0$ by combining the first message $m_0$ with the first hash output using an invertible function, and generate a second masked message $c_1$ by combining the second message $m_1$ with the second hash output using the invertible function. The sender device can transmit, to the receiver device, the second elliptic curve $y_0$, the third elliptic curve $y_1$, the first masked message $c_0$, and the second masked message $c_1$.

These and other embodiments of the disclosure are described in detail below. For example, other embodiments are directed to systems, devices, and computer readable media associated with methods described herein.

A better understanding of the nature and advantages of embodiments of the invention may be gained with reference to the following detailed description and accompanying drawings.

BRIEF DESCRIPTION OF THE DRAWINGS

FIG. 4 shows a message flow diagram illustrating two-round semi-honest secure oblivious transfer between a sender and a receiver.

FIG. 5 shows a message flow diagram illustrating two-round malicious secure oblivious transfer between a sender and a receiver

FIG. 7 shows a message flow diagram illustrating three-round oblivious transfer extension protocol.

FIG. 8 shows a flow chart of establishing two-round secure oblivious transfer on a sender device's side.

FIG. 9 shows a flow chart of establishing two-round secure oblivious transfer on a receiver device's side.

TERMS

Figure 1:
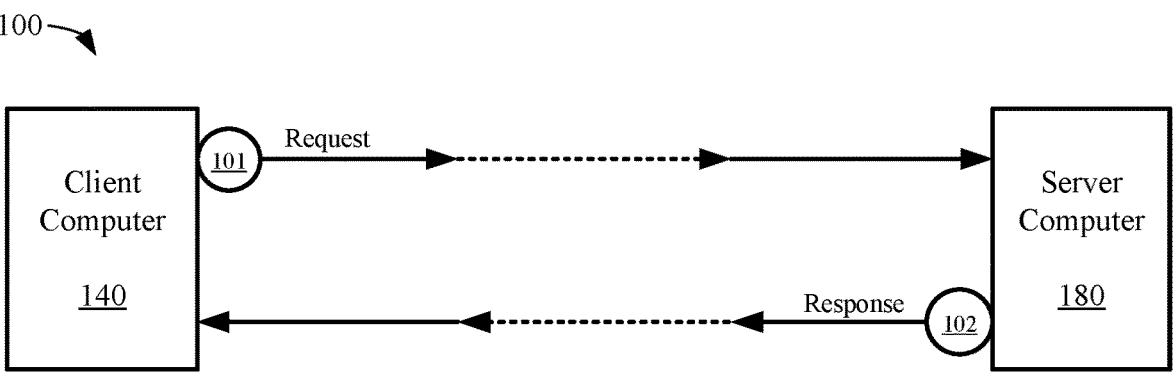
FIG. 1 shows a simplified message flow diagram illustrating secure communications between a client computing device and a server computing device, in accordance with some aspects.

Prior to discussing aspects of the invention, some terms can be described in further detail.

The term "server computing device" may include a computing device or cluster of computing devices. For example, the server computing device can be a large mainframe, a minicomputing device cluster, or a group of servers functioning as a unit. In one example, the server computing device may be a database server coupled to a Web server. The server computing device may be coupled to a database and may include any hardware, software, other logic, or combination of the preceding for servicing the requests from one or more client computing devices. The server computing device may comprise one or more computational apparatuses and may use any of a variety of computing structures, arrangements, and compilations for servicing the requests from one or more client computing devices.

The term "public/private key pair" may include a pair of linked cryptographic keys generated by an entity (e.g., a computing device or an electronic device). The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on elliptic curve cryptography (ECC), lattice or code based cryptosystems such as McEliece or learning with errors (LWE) which may be post-quantum secure.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. For example, a first computing device may generate a first key pair include a first public key and a first private key. A second computing device may generate a second key pair including a second public key and a second private key. The first computing device may generate a shared secret using the second public key of the second computing device and the first private key of the first computing device. The second computing device may generate the same shared secret using the first public key of the first computing device and the second private key of the second computing device. The first computing device and the second computing device may both use the shared secret to generate a session key.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

"Forward secrecy" is a characteristic of secure communications that refers to the ability of the messages to not be decrypted if the private keys of the sender and/or the receiver of the messages are later compromised. "Perfect forward secrecy" is a characteristic of secure communications that refers to the ability of the messages to not be decrypted if the private keys of both the sender and the receiver of the messages are later compromised. In one scenario, the private keys may be obtained by a third party that gains physical access to the computing devices. In another scenario, a third computing device can spend a long enough time to crack the private key, which would be impractical but not impossible. However, secure communications having "perfect forward secrecy" cannot be decrypted even if the static private keys of the sending and receiving computing devices are both compromised. One way to achieve "perfect forward secrecy" is by not encrypting the messages using static private keys. Accordingly, if the static private keys are compromised, they cannot be used to decrypt the messages. In one example, an encryption key pair can be randomly generated for the key exchange and then deleted (e.g., zeroized) shortly thereafter. Accordingly, the private key cannot be obtained if a third party later gains physical access to the computing device. Therefore, communications sent in the past maintain their secrecy going forward. Furthermore, even if one message is compromised, the other messages are not compromised because there is no single key used for encryption across different messages.

A "random oracle" responds to every unique query with a random response chosen uniformly from its output domain. If a query is repeated the random oracle responds the same way every time that query is submitted. That is, a random oracle is a mathematical function chosen uniformly at random, that is, a function mapping each possible query to a (fixed) random response from its output domain.

A "key agreement" enables two or more parties to agree on a key in such a way that both influence the outcome. Key agreements do not require or permit third party input and thus do not reveal to a shared secret any eavesdropping party what key has been agreed upon. Protocols where both parties influence the final derived key may be the only way to implement perfect forward secrecy.

A "cryptographic function" is a mathematical equation, function, process, or algorithm that may be used to encrypt or decrypt information. Some cryptographic functions are one-way functions, such as hash functions. Other cryptographic functions may be reversible if a designated input, such as a key, is provided.

An "input value" is an alphanumeric value or string used as input or an initiator of computation of a function. An input value defines a number of values to be generated and transmitted to a sender device. Specifically, the input value may define the number of elements in the set of values to be transferred to a sender device as part of a request for encrypted information. Because the number of pieces of encrypted data from which a selection is made by the sender device may be determined based on the number of values received, the input value may be thought of as an indicator of the size of a potential key space on the sender device.

A "cryptographic value" is an alphanumeric value or string that has been encrypted. A cryptographic value may be generated by encrypting a public key and a piece of data resident on a sender device.

An "encrypted program" refers to a cryptographic protocol or application. The encrypted program may be evaluated privately at one or participating parties, using encrypted data provided during a fast-oblivious transfer. Examples of encrypted programs include but are not limited to garbled circuits, secret shares, secure multi-party computations, and the like.

DETAILED DESCRIPTION

Systems and methods according to aspects enable secure efficient oblivious transfers between computing devices. Computing devices may efficiently and securely execute a key (or message) agreement using shared computation to transfer data, such as cryptographic keys (or messages), without either party having actual knowledge of the specific data being transferred. The encrypted data, once transferred, can be used to execute an encrypted program amongst the parties.

Certain aspects present significant advantages in efficiency and speed of key agreements by enabling oblivious transfers with a random oracle to enable the transmission of cryptographic values and the transmission of cryptographic protocols. Hash functions characterized as random oracles may compute unique values enabling random selection of cryptographic keys or data to be shared between computing devices. Key agreements may be quickly executed, with random cryptographic keys obtained at each execution. The obtained cryptographic keys or data may be used to execute or evaluate additional cryptographic protocols.

In general, a key agreement protocol involves two or more parties agreeing on a cryptographic key with both parties influencing the outcome of which key is selected. Key agreements can remove the ability of a third party to influence the choice of which key is selected. Secure key agreements protect the key choice from eavesdropping parties. The use of a key agreement protocol avoids some of the key distribution security problems associated with conventional transmission of cryptographic keys.

Certain aspects provide fast, privacy-preserving, key agreements for use in obtaining encrypted data for a subsequent execution of an encrypted program. The oblivious transfer enables transferring sensitive data without providing either party with knowledge of the data being transferred. For example, a receiver device may have permission to access data within a data set of a sender device, but may not wish for the sender device to know which data are accessed. Similarly, the sender device may prefer that the receiver device only access a predetermined number of elements of the data set. Various aspects enable the efficient transfer of the predetermined number of elements from the data set without informing either party as to which elements were transferred to the receiver.

Efficient, privacy-preserving data transfers as described herein may be particularly advantageous in distributed big data analysis because they enable data wonders to share data for analysis without becoming aware of the work being done by analysis. Encrypted data is transferred as a result of both parties computing part of a cryptographic function without requiring a third-party, thus preserving privacy in a light-weight and efficient manner.

Fast oblivious transfer are also advantageous in supporting auction bidding systems. A bidding system may receive encrypted bids without being aware of the bidder or the details of the bid until they are needed. Two or more parties may engage in the computation of a cryptographic function on the encrypted bids, with the output being the winning bid and the dollar amount of the bid.

Certain aspects of the present disclosure may include techniques for pair-wise oblivious transfers. Techniques are described herein with regard to two computing devices exchanging computing portions of a cryptographic function in order to exchange encrypted information. However, the described techniques scale in a pair-wise fashion, enabling the addition of more parties to the function computation and data exchange.

As a further advantage, the techniques for efficient, privacy-preserving oblivious transfer may provide post-quantum computing security benefits because the distribution of the computational tasks across multiple devices may be very difficult for a computing device of any processing power to overcome with brute force computation.

The various aspects disclosed herein provide solutions for enabling secure, non-traceable, authenticable fast oblivious transfers between computing devices. By enabling a receiver device to compute multiple values and receive from a sender device a piece of encrypted data, such as a cryptographic key, corresponding to one of the values, the various techniques ensure that neither party is aware of the specific encrypted data being transferred back to the receiver device. Because the computation occurs within two or more computing devices without requiring a third party to authenticate or pass information, the transfers are fast and efficient, reducing time and computing resources needed to exchange encrypted information.

I. Multi-Party Computation Network

FIG. 1 shows a simplified message flow diagram 100 illustrating secure communications between a client computing device 140 and a server computing device 180, in accordance with some aspects. The client computing device 140 can be a receiver device, and the server computing device 180 can be a sender device. The message flow diagram 100 may be used between any first computing device and any second computing device. The client/server distinction used herein is merely exemplary and made to improve readability. In some aspects, the client computing device 140 may perform the operations described as being performed by the server computing device 180. In some aspects, the server computing device 180 may perform the operations described as being performed by the client computing device 140.

Referring to FIG. 1, the client computing device 140 may have the capability to generate public/private key pairs and our implement hash functions and random values to implement key agreements. The client computing device 140 and the server computing device 180 may communicate over an unsecured network 160 (e.g., the internet or a wireless local area network). The unsecured network 160 may be "unsecured" in that the communication medium itself is not physically secured or it may be "unsecured" in that communications do not travel directed between two parties but also through other third parties in the network.

The client computing device 140 and the server computing device 180 may perform a key exchange in order to establish secure communications over the unsecured network 160. For example, the client computing device 140 and the server computing device 180 may perform a public/private key exchange or an elliptical-curve Diffie-Hellman key exchange as described above to establish a shared secret between the client computing device 140 and the server computing device 180. The client computing device 140 and the server computing device 180 may each derive a session key from the shared secret for encrypting and decrypting communications between each other.

At 101, the client computing device 140 can transmit a request message to the server computing device 180 to initiate the establishment of secure communication. In some aspects, the request message may include a shared secret such as multiple random values. The client computing device 140 may decrypt the values within a response message using the shared secret to obtain cryptographic keys.

The server computing device 180 can receive the request message from the client computing device 140 via the unsecured network 160. The server computing device 180 can use values within the request message to encrypt multiple cryptographic keys using the shared secret. In some aspects, the server computing device 180 can generate a response message 102 including multiple cryptographic values each representing encryption of one of the cryptographic keys. The response message 102 is transmitted to the client computing device 140 which may attempt to decrypt each of the cryptographic values using a private key. The response message 102 may also include an encrypted program which may be accessed using the decrypted cryptographic key. Alternatively, the encrypted program may be sent in a subsequent message.

II. Secure Transfers Using Oblivious Transfers

An oblivious transfer is a cryptographic primitive often used in the context of secure multi party computation, and is privacy-preserving during a joint computation. Among others, it solves the task of securely distributing cryptographic keys for cryptographic that can be seen as encrypted programs. The combination of oblivious transfers and encrypted programs gives a generic solution for securely computing any functionality between two parties.

In an oblivious transfer, a sender and a receiver interact in a protocol and at the end of the protocol, the sender outputs two messages $m_0$, $m_1$ while the receiver outputs b, $m_b$ for choice bit b. Security asks that the sender does not learn b and the receiver does not learn $m_{1-b}$. Oblivious transfer implies key exchange and can be constructed from special types of public key encryption or certified trapdoor permutations. In the present disclosure, an oblivious transfer is instantiated with a key exchange. This framework is very agile in terms of assumptions and provides post-quantum security efficiently.

A. Use of OT with Sender and Receiver Devices

Figure 2:
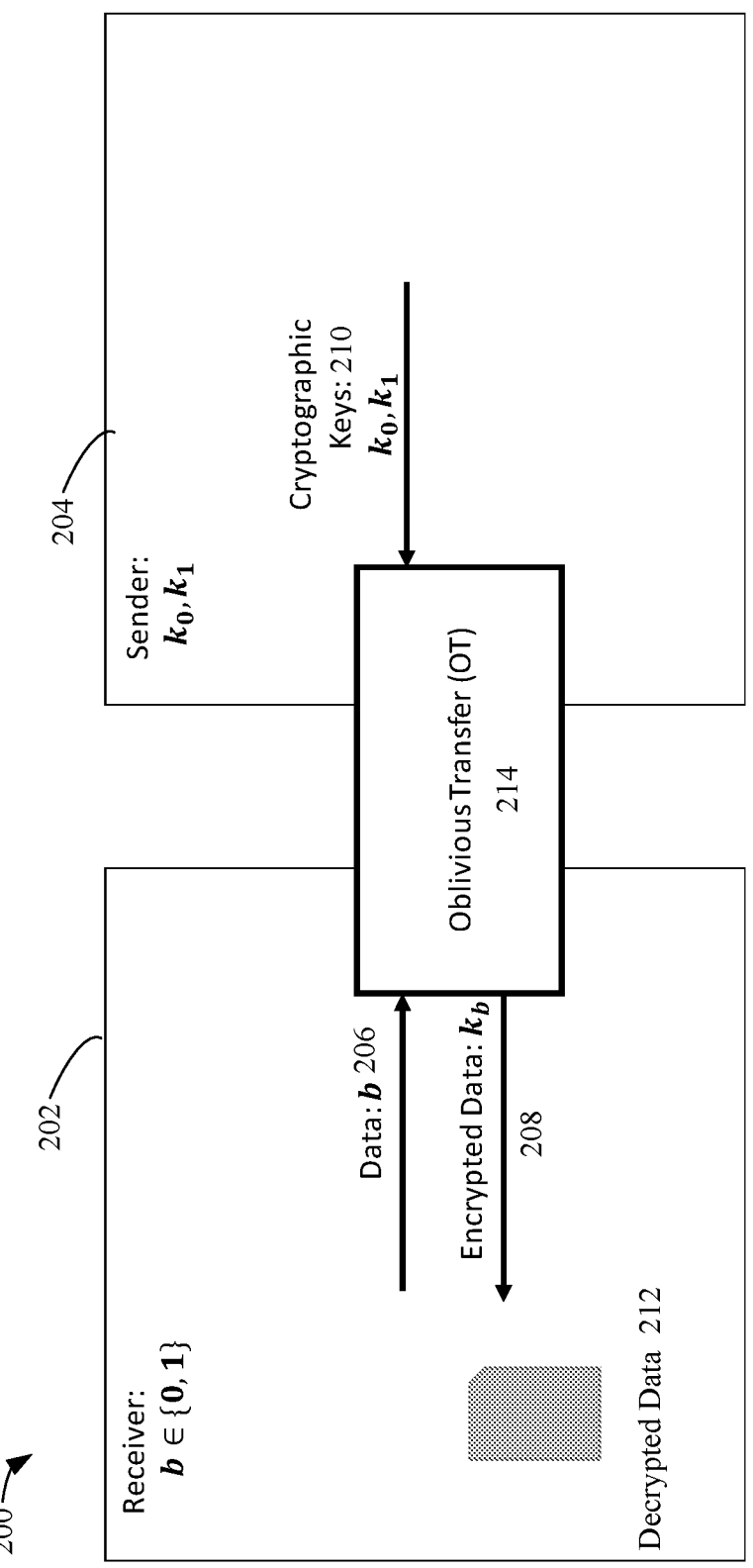
FIG. 2 shows a message flow diagram of a receiver device securely obtaining a key from a sender device using oblivious transfer.

FIG. 2 shows a message flow diagram of a receiver device securely obtaining a cryptographic keys from a sender device using oblivious transfer. The message flow diagram 200 shows a receiver device 202 (e.g., client computing device 140) requesting cryptographic keys 210 from a sender device 204 (e.g., server computing device 180). The sender device 204 may encrypt and send some or all of the cryptographic keys 210. The receiver device may decrypt one of the received cryptographic keys 210 using a private key, without actual knowledge as to which key is decrypted. In some examples, the sender device 204 may generate, maintain, and, or store both the cryptographic keys 210 and an encrypted program such as encrypted program.

In oblivious transfers 214, one party may have several pieces of data, and another party may request and obtain some or all of those pieces of data, and may only decrypt one piece to create decrypted data 212, without revealing to either party, which piece of decrypted data 212 was obtained. In the message flow diagram 200, the receiver device 202 may generate multiple values, i.e. pieces of data

206 using an input value b. The input value b may be an element of a set of inputs such as the set {0, 1}. In some examples the size of the input set may be as large as the number of cryptographic keys 210 that may be generated by or stored on sender device 204 or vice versa. The actual value of input value b will determine which of the cryptographic keys 210 is decrypted by the receiver device 202. The input value b may thus correspond to one of the elements of set of cryptographic keys 210.

Sender device 204 has a set of cryptographic keys 210 including a first key $k_0$ and a second key $k_1$. If input value b is set to 0 then the sender device 204 may encrypt and send both the first key $k_0$ and the second key $k_1$, but the receiver device 202 will only be able to decrypt the first key $k_0$ because the private key is generated by the receiver device 202 using the input value of b=0. The receiver device 202 may decrypt one of the cryptographic keys 210 received from the sender device 204 using the decryption key corresponding to the input value b, without revealing the actual value of b to either the receiver device 202 or the sender device 204.

In response to receiving a number of values having a size equal to the set of input values, and at least one of the multiple values generated using the input value b, the sender device 204 may transmit all of the cryptographic keys 210 to receiver device 202. Although the receiver device 202 may use all or some of the values in the input value set to generate the multiple values sent to the sender device 204, the sender device 204 will not have knowledge of which of the multiple values corresponds to the input value b. By transmitting all elements within the set of cryptographic keys 210 that correspond to the received multiple values, the sender device 204 is prevented from knowing which of the cryptographic keys will be used or accessed by the receiver device 202. The sender device 204 may only be aware that a request for a cryptographic keys 210 was made and that a number of cryptographic keys 210 corresponding to the number of multiple values received were sent to the receiver device 202.

The sharing of some or all cryptographic keys 210 between the receiver device 202 and sender device 204 may present the possibility of teaching the receiver device 202 all of the cryptographic key options. To avoid this oversharing, the receiver device 202 may only be able to decrypt one of the cryptographic keys 210. Specifically, only $k_b$ may be decrypted from the encrypted data 208 containing the cryptographic keys 210, and may require the use of input value b. Decryption of $k_b$ occurs at the receiver device 202 using a private decryption key generated using the input value b, leaving the sender device 204 ultimately unaware of which cryptographic key was decrypted, while also preventing the receiver device 202 from discovering more than one of the cryptographic keys 210.

In the oblivious transfer, the encrypted data 208 (e.g., encryption of cryptographic keys $k_0$ and $k_1$) of the sender device can be viewed as the masked (or encrypted) messages $M_0$ and $M_1$ of the messages $m_0$ and $m_1$, where the receiver device obtains the encryption of $k_b$ (or message $M_b$) according to the input value b. The receiver device can then de-mask (decrypt) the encryption of $k_b$ (or message $M_b$) to obtain the decrypted data 212, or $k_b$ (or the message $m_b$).

B. Example Applications

Figure 3:
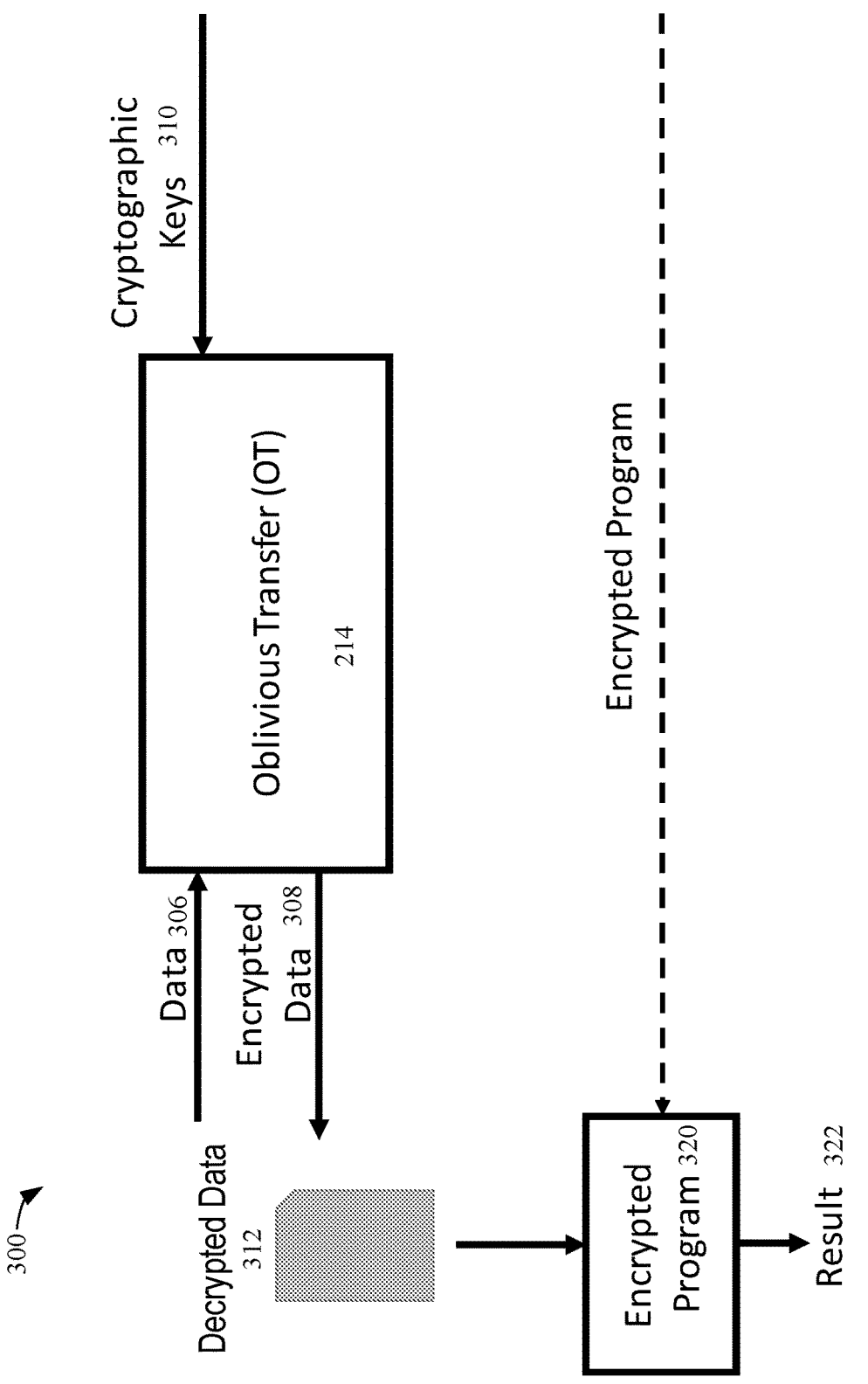
FIG. 3 shows a message flow diagram of an example secure data exchange using an oblivious transfer.

FIG. 3 shows a message flow diagram of an example secure data exchange using an oblivious transfer. In the message flow diagram 300, an oblivious transfer 214 may receive data 306, e.g., multiple values produced by a receiver device 202. Thus, the receiver device 202 may send the data 306 to a sender device 204 having several cryptographic keys 310 and an encrypted program 320, and may receive both the cryptographic keys 310 and the encrypted program 320 in response. The cryptographic keys 310 and the encrypted program 320 may be sent in the same or different transmissions.

Oblivious transfer 214 may receive a cryptographic key 310 at a sender device 204, in order to return an output of encrypted data 308 to be decrypted by the receiver device 202. The obtained decrypted data 312 may be used in accessing, evaluating, or executing an encrypted program 320. The oblivious transfer 214 may make use of one or more shared secrets including the multiple values generated by a receiver device 202, and multiple cryptographic values (e.g., encrypted data 308) generated by the sender device 204.

The sender device 204 to receive the multiple values from the receiver device 202 and use these values to select one or more of the cryptographic keys 310 without knowledge by any participating parties as to which key has been selected. Although all or a portion of the cryptographic keys 310 are sent to the receiver device 202 as cryptographic values or encrypted data 308, the receiver device 202 may only decrypt one of the pieces of encrypted data 308 to reveal one of the cryptographic keys 310. In this manner, the oblivious transfer 214 may enable the provision of a single cryptographic key between two parties, without the parties knowing which cryptographic key is exchanged.

The sender device 204 stores and maintains the cryptographic keys 310 and may also be responsible for storing and maintaining an encrypted program 320. This encrypted program 320 may be passed to the receiver device 202 as multiple cryptographic values, e.g., encrypted data 308. The encrypted data 308, e.g., the cryptographic keys 310, may be passed the encrypted program 320, which may be a cryptographic protocol such as garbled circuit, multi-party computations, or other cryptographic protocols. The received encrypted data 308 is decrypted by the receiver device 202 and used to access, evaluate, or execute the encrypted program 320.

In certain aspects, the oblivious transfer 214 may be used as part of a key agreement protocol. A receiver device (e.g., the client or server in FIG. 1) may use a random oracle to generate a number of unique values based on an input value, which may be one of a set of input values. The number of input values in the set may define the number of cryptographic keys 310 returned to the receiver device. Each of the unique values are data 306 corresponding to one of the cryptographic keys 310. Thus, each input to the random oracle produces a number of unique values equivalent to the potential key space (e.g., the number of cryptographic keys 310 on a sender device). The cryptographic keys 310 are encrypted and transmitted to the requester as encrypted data 308, but only one key associated with one of the multiple values of data 306 can be decrypted by the requester. For example, only the cryptographic key corresponding to the input value may be decrypted by the requester.

The encrypted program 320 may be accessed and or executed using the cryptographic key obtained by decrypting the encrypted data 308. The encrypted program 320 may be a cryptographic protocol such as multi-party computation, garbled circuit, or those requiring a secret share or shared key. The cryptographic key obtained from decrypting the encrypted data 308 may thus be used as the shared secret or shared key for carrying out the encrypted program 320 between computing devices.

Applications of the oblivious transfer 214 may be used as part of an auction system or distributed big data analysis system. Oblivious transfer 214 may receive data 206 in the form of auction bids or research requests for a sender device 204 hosting the bidding system or research data repository. The sender device 204 may select a number of bids or data sets as defined by data 306 received from the receiver device 202. The receiver device 202 receives encrypted data 308 including the auction bids and an auction bid management program (e.g., an encrypted program 320); or multiple pieces of data or data sets along with a processing tool. The receiver device 202 may decrypt the encrypted data 308 to receive the winning bid and may use this input to execute the auction bid management program to inform the winning bidder and take additional actions such as automatic withdrawal of funds. Similarly, the requester may decrypt one of the received encrypted pieces of data or data sets and may use this data as input to the processing tool, which may further scrub any private information (e.g., for HIPPA compliance purposes).

In another aspect, a big data analysis system may be implemented in which the input value used to generate the data 306 corresponds to one of the cryptographic key 310, each of which is capable of enabling access to one of a number of computing devices hosting research data within the big data analysis system. The cryptographic keys 310 may be sent to the receiver device 202 as encrypted data 308, and decrypted using a private key to provide one of the cryptographic keys 310. The obtained cryptographic key 310 may be used as input to the encrypted program 320 which may direct a subsequent research data request to a computing device within the big data analysis system that corresponds to the obtained cryptographic key. Thus, the receiver device 202 may be given access to a research data set, without knowing which research data set it is being given, or where the data originates. Computing devices within the system are also unaware of who is using their research data and thus cannot track research trends by other organizations.

Many aspects of the encrypted program 320 may be advantageously implemented using blockchain technology. For instance, in the auction example previously described, the encrypted program 320 may involve the use of smart contracts in which the value of a winning bid is automatically deducted from a winner's payment account at the time the win is determined. Similarly, blockchain or other ledger based technologies may be useful in tracking use of research data or identifying research data hoses within a big data analysis system, and may enable immediate access to a host computing device by a receiver device 202 having the corresponding cryptographic key.

For the purposes of providing a clear and concise disclosure of the various aspects, the following description of fast, oblivious transfers is made with reference to examples of key agreements. However, as discussed above, the application of these techniques are not limited to key agreements and may be applied widely to systems in which a first computing device requires the use of one of multiple pieces of data maintained on a second computing device, without either computing device being aware of which of the multiple pieces of data is actually obtained by the first computing device.

III. Post-Quantum Secure OT Protocols

Oblivious transfer (OT) is an interactive protocol between two parties: a sender and a receiver. As described above, an OT protocol involves a sender holding two messages $m_0$ and $m_1$, and a receiver holding a bit $b \in \{0, 1\}$. At the end of the protocol, the receiver should only learn the message $m_b$ and nothing about the other message $m_{1-b}$, while the sender should learn nothing about the bit b. OT serves as a fundamental building block in cryptography, particularly in secure multi-party computation (MPC). Round optimal OT protocols imply round-optimal MPC protocols and hence are always desirable.

With the steady progress in quantum computing, the study of post-quantum cryptography has been gaining significant momentum for the last few years in light of Shor's algorithm, which breaks assumptions like factoring and discrete-log. OTs are known from various post-quantum assumptions such as lattices codes, isogenies, etc. Among them most isogeny-based constructions are from "non-standard" assumptions.

A new oblivious transfer protocol can be designed by using isogeny elliptic curves that have post-quantum secure hardness assumptions. Most popular classes of such assumptions are lattices, but isogenies can be built on a new class of assumptions called commutative super-singular isogeny Diffie-Hellman (CSIDH) assumption. This is a class of assumptions that derives its hardness from computing some isogeny maps between elliptic curves In various embodiments, first feasibility results on achieving round-optimal, maliciously secure and plausibly post-quantum secure OT protocols in various settings from the CSIDH family of isogeny-based assumptions can be established. In particular, two new round-optimal maliciously secure OT protocols in the plain and common reference string (CRS) model can be presented, respectively, while relying on standard (or relatively well-established) assumptions in the CSIDH framework. First UC-secure OT extension protocol that relies on a relatively well-established assumption in the CSIDH framework can also be presented.

The CSIDH assumption can have different types of assumptions: computational, decisional, and reciprocal. The reciprocal CSIDH assumption can be treated similarly as the computational CSIDH assumption. The assumptions can have different hardness level. For example, the computational CSIDH assumption has a weaker hardness assumption than the decisional CSIDH assumption. This means that solving a problem with a computation CSIDH is harder than a problem with a decisional CSIDH assumption. Therefore, it is more advantageous to base the assumption on computational CSIDH assumption than the decisional CSIDH for the oblivious transfer protocol.

Multiple oblivious transfer (OT) protocols can be built based on isogenies-based assumptions. In the embodiments, a two round oblivious transfer in common reference string from computation CSIDH assumption, a four-round oblivious transfer in the plain model from the decisional CSIDH assumption, and a three round oblivious transfer extension protocol in the random oracle model from the reciprocal CSIDH assumption can be built.

The multiple OT protocols based on isogeny-based assumptions can be used for other oblivious transfer protocols as well. For example, the OT protocols with isogenies-based assumptions can be used in OT protocols with classical assumptions.

Cryptographic group actions are used in various implementations and can be defined in the following manner. A group G is said to act on a set X if there is a map $*: G \times X \rightarrow X$ that satisfies the following: 1) Identity: If e is the identity element of G, then for any $x \in X$, we have $e*x=x$, and 2) Compatibility: For any g, $h \in G$ and any $x \in X$, we have $(gh)*x=g*(h*x)$.

Group actions (G, X,*) can satisfy one or more of the following properties: 1) Abelian: The group G is abelian, 2) Transitive: For every $x_1, x_2 \in X$, there exists a group element $g \in G$ such that $x_2=g*x_1$. 3) Faithful: For each group element $g \in G$, either g is the identity element or there exists a set element $x \in X$ such that $x \neq g*x$, and 4) Free: For each group element $g \in G$, g is the identity element if and only if there exists some set element $x \in X$ such that $x=g*x$.

The abbreviated notation (G, X,*) can be used to denote a group action. A cryptographic group operation * can also be known as isogeny mapping. The cryptographic group actions can be used in OT protocols such as two-round OT protocol in CRS and three-round OT extension protocol.

IV. Two-Round Oblivious Transfer (OT)

A semi-honest secure oblivious transfer assumes that both a sender and a receiver adhere to how the protocol is supposed to be executed honestly. But it is not completely honest as both parties can still try to get some information about the other party's inputs. In order to prevent this from happening, a common reference string (CRS) can be used. The common reference string can be a public randomness generated by a trusted authority that none of the two parties can manipulate but only access it.

A maliciously secure oblivious transfer assumes that both a sender and a receiver can be malicious (corrupted) and try to deviate from the protocol. Both the sender and the receiver can maliciously take other actions besides the protocol. In order to prevent this from happening, a common reference string (CRS) and a non-interactive zero-knowledge proof of knowledge (NIZKPOK) can be used. The NIZKPOK guarantees that whatever commitment made using the NIZKPOK cannot be changed, thereby binding the values used for OT protocol such that even if the sender and the receiver are corrupted, they cannot go back and change the commitments.

An effective group action (abbreviated throughout as an EGA) can be defined. At a high level, an EGA is an abelian and regular group action with certain special computational properties that allow it to be useful for cryptographic applications. Formally, an abelian and regular group action (G, X,*) can be effective if the following properties are satisfied.

1) The group G is finite and there exist efficient probabilistic polynomial time (PPT) algorithms for (a) Membership testing, i.e., to decide if a given bit string represents a valid group element in G, (b) Equality testing, i.e., to decide if two bit strings represent the same group element in G, (c) Sampling, i.e., to sample an element g from a distribution G on G, (d) Operation, i.e., to compute gh for any g, $h \in G$, and (e) Inversion, i.e., to compute $g^{-1}$ for any $g \in G$.

2) The set X is finite and there exist efficient algorithms for (a) Membership testing, i.e., to decide if a bit string represents a valid set element and (b) Unique representation, i.e., given any arbitrary set element $x \in X$, compute a string $\hat{x}$ that canonically represents x.

3) There exists a distinguished element $x_0 \in X$, called the origin, such that its bit-string representation is known.

4) There exists an efficient algorithm that given (some bit-string representations of) any $g \in G$ and any $x \in X$, outputs $g*x$.

An EGA (G, X,*) is weakly unpredictable if the family of functions (more specifically, permutations) $\{\pi_g : X \rightarrow X\}_{g \in G}$ is weakly unpredictable, where $\pi_g$ is defined as $\pi_g : x \mapsto g*x$.

The embodiments described below contain a 2-round OT protocol in the (structured) CRS plus random oracle model from any weak unpredictable effective group action (wu-EGA), or computational CSIDH assumption. It is round-optimal and UC-secure against malicious adversaries (i.e., corruption of parties). The construction can also be represented as the format of two-round oblivious transfer (OT) protocol in the CRS model with a tuple of four algorithms/functions (Setup, OTR, OTS, OTD). The OTR, OTS, and OTD refer respectively to OT-Receiver, OT-Sender, and OT-Dervice. OTR is for OT-Receiver since the receiver runs the function to generate the first message, OTS is for OT-Sender since the sender runs the function to generate the second message, and OTD is for OT-Derive, which derives the final output. These functions are described below.

The two-round oblivious transfer (OT) protocol in the CRS model can be formally defined. A two-round OT protocol in the CRS model of a tuple of four algorithms of the form OT=(Setup, OTR, OTS, OTD) can be described below.

Setup($1^{\kappa}$): Takes as input the security parameter $\kappa$ and outputs a CRS string.

OTR(crs, b∈0,1): Takes as input the crs and a bit b∈0,1, and outputs the receiver's message $ot_1$ and the receiver's (secret) internal state st.

OTS(crs, $ot_1$, $m_0$, $m_1$): Takes as input the crs, the receiver's message $ot_1$, a pair of input strings ($m_0$, $m_1$), and outputs the sender's message $ot_2$.

OTD (crs, st, $ot_2$): Takes as input the crs, the sender's message $ot_2$, and the receiver's internal state st, and outputs a message string m'.

A. Semi-Honest Secure Oblivious Transfer

In the semi-honest secure version, it is assumed that both of the parties, a sender and a receiver, can follow the protocol specification exactly. However, it may try to learn more information than allowed by looking at the transcript of messages that it received and its internal state. Therefore, the semi-honest adversaries can guarantee that there is no inadvertent leakage of information, and the parties involved can trust each other. But the parties may still want to make sure no record of their input is found elsewhere. The following semi-honest secure oblivious transfer can be used when the sender is malicious.

FIG. 4 shows a semi-honest secure oblivious transfer. At the high level, there is a two-round or two-message protocol between the receiver R 400 and the sender S 402, where the first message is from the receiver R 400 to the sender S 402, and the second message is from the sender S 402 to the receiver R 400. At the end of receiving the message, the receiver R 400 is able to complete the protocol and recover one of the messages.

(G, X, *) can be a wU-EGA group operation with an elliptic curve x being a publicly available element in the set X. A random oracle function H can map an elliptic curve into a bit string (H: X→$\{0,1\}^1$).

CRS 401 can provide public randomness that none of the two parties, the sender and the receiver, can manipulate but has access to. CRS 401 can include a first common reference string $x_0$ and a second common reference string $x_1$. The first common reference string $x_0$ can be generated by combining with the elliptic curve x and an isogeny map $g_0$ using an isogeny mapping. The second common reference string $x_1$ can be generated by combining with the elliptic curve x and an isogeny map $g_1$ using an isogeny mapping. The isogeny maps $g_0$ and $g_1$ can be sampled from the generator G. This step can correspond to the Setup($1^{\lambda}$) algorithm.

In step S402, the Receiver R 400 can generate a first elliptic curve z. The Receiver R 400 can sample a first random isogeny map r using a generator G and obtain a third common reference string $x_b$ according to a choice bit b (or input value b) from the CRS 401. Note that the third common reference string $x_b$ can be either equivalent to the first common reference string $x_0$ or the second common reference string $x_1$ depending on the choice bit b. The first random isogeny map r can then be combined with the third common reference string $x_b$ using an isogeny mapping operation to generate a first elliptic curve z. This step can correspond to the OTR(crs, b) algorithm with a receiver state st=(b,r) and a receiver message $ot_1$=z.

In step S404, the Receiver R 400 can transmit the first elliptic curve z (or the receiver message $ot_1$) to the Sender S 402.

The Sender S 402 can store a first message $m_0$ and a second message $m_1$. The Sender S 402 can send a third message $m_b$ back to the Receiver R 400 upon request. However, since the Sender S 402 does not know the choice bit b and needs to keep a fourth message $m_{1-b}$ away from the Receiver R 400, the Sender S 402 can mask (e.g., by encrypting) two messages $m_0$ and $m_1$, so that the Receiver R 400 is able to de-mask (e.g., decrypt) only the third message $m_b$ and not the fourth message $m_{1-b}$. The process of masking the messages are further described in step S405.

In step S405, the Sender S 402 can generate a second elliptic curve $y_0$ and a third elliptic curve $y_1$. The Sender S 402 can sample a second random isogeny map $k_0$ and a third random isogeny map $k_1$ using the generator G, and obtain the first common reference string $x_0$ and the second common reference string $x_1$ from the crs 401. The second random isogeny map $k_0$ can then be combined with the first common reference string $x_0$ using an isogeny mapping operation to generate the second elliptic curve $y_0$. The third random isogeny map $k_1$ can be combined with the second common reference string $x_1$ using an isogeny mapping operation to generate a third elliptic curve $y_1$.

The Sender S 402 can generate a first random oracle output (e.g., a hash output) using a random oracle function H (e.g., a hash function) that operates on a first combined value of the second random isogeny map $k_0$ and the first elliptic value z. The first combined value can be obtained by performing an isogeny mapping operation on the second random isogeny map $k_0$ and the first elliptic value z. An invertible operation (e.g., XOR) can then be performed on the first random oracle output and the first message $m_0$ to generate the first masked message $c_0$. Other group operations that are invertible may be used in place of the XOR. For example, multiplication, division, subtraction, or elliptic-curve addition can be used.

The Sender S 402 can generate a second random oracle output (e.g., a hash output) using a random oracle function H (e.g., a hash function) that operates on a second combined value of the third random isogeny map $k_1$ and the first elliptic value z. The second combined value can be obtained by performing an isogeny mapping operation con the third random isogeny map $k_1$ and the first elliptic value z. The invertible operation can then be performed on the second random oracle output and the second message $m_1$ to generate the second masked message $c_1$. This step can correspond to the OTS(crs, ($m_0$, $m_1$), ot1) algorithm with a sender message $ot_2$=($y_0$, $y_1$, $c_0$, $c_1$).

In step S406, the Sender S 402 can transmit the second elliptic curve $y_0$, the third elliptic curve $y_1$, the first masked message $c_0$, and the second masked message $c_1$ (or the sender message $ot_2$) to the Receiver R 400. All this information is sent as the Sender S 402 does not know the choice bit b. By sending the masked messages $c_0$ and $c_1$ along with the elliptic curves $y_0$ and $y_1$, the Sender S 402 can allow the Receiver R 400 to only de-mask/decrypt the masked message $c_b$ while keeping the masked message $c_{1-b}$ hidden.

In step S408, the Receiver R 400 can obtain the third message $m_b$. Note that the third message $m_b$ is either equivalent to the first message $m_0$ or the second message $m_1$ depending on the choice bit b. The receiver R can first generate a third random oracle output (e.g., a hash output) using the random oracle function H (e.g., a hash function) that operates on a third combined value of the first random isogeny map r and a fourth elliptic curve $y_b$. Note that the fourth elliptic curve $y_b$ can either be equivalent to the second elliptic curve $y_0$ or the third elliptic curve $y_1$ depending on the choice bit b.

The third combined value can be obtained by performing an isogeny mapping operation with the first random isogeny map r and the fourth elliptic curve $y_b$. The invertible function (corresponding to one used in step S405) can then be performed on the third random oracle output and the third masked message $c_b$ to generate the third message $m_b$. The invertible aspect of the function causes the random oracle output (e.g., either the first or second random oracle output depending on the choice bit b) from step S405 to cancel so that the third message $m_b$ is obtained. Note that third masked message $c_b$ is either equivalent to the first masked message $c_0$ or the second masked message $c_1$ depending on the choice bit b. This step can correspond to the OTD (st,$ot_2$) algorithm with an output of $m_b$.

B. Malicious Secure Oblivious Transfer

In the malicious secure version, it is assumed that there is a possibility that the receiver and the sender might actually be malicious, and they might try to deviate from the protocol or behave weirdly during the execution of the protocol in order to cheat (via to learn more information than allowed). For example, the receiver and the sender can change the inputs and outputs, abort the protocol, and etc. Therefore, a non-interactive zero knowledge proof of knowledge (NIZKPOK) can be used to get security even if the receiver and the sender are maliciously corrupted.

FIG. 5 shows a malicious secure oblivious transfer. The process of FIG. 5 may be similar to the process in FIG. 4. However, the Receiver R 500 can compute a NIZKPOK proof pf that guarantees that the Receiver R 500 did not change or manipulate a first elliptic curve z and the bit b later on. The first elliptic curve z can be generated by performing an isogeny mapping operation on a first random isogeny map r and a third common reference string $x_b$ (which either has a value of a first common reference string $x_0$ or a second common reference string $x_1$ according to a choice bit b) (S502). This NIZKPOK proof pf can be sent to the Sender S (S504). The NIZKPOK proof can come with specifications of algorithms, including a verification algorithm. The sender S (S505) can use the verification algorithm to verify the NIZKPOK proof pf. If the NIZKPOK proof does not verify, then the Sender S 502 can essentially abort. By adding the NIZKPOK proof, the receiver R 500 cannot deviate the values of a choice bit b and the first elliptic curve z after computing the NIZKPOK proof. Not being able to change the first elliptic curve z can additionally guarantee that the first random isogeny map r and the third common reference string $x_b$ do not change.

In some embodiments, non-interactive witness indistinguishable proof of knowledge (NIWIPOK) can be used in place of the non-interactive zero knowledge proof of knowledge (NIZKPOK) to add security against the malicious receiver. The sender can verify the proof as part of the OT protocol. The NIWIPOK can be performed by applying Fiat-Shamir Transform and can be instantiated based on computational CSIDH assumption.

V. 4-Round OT in the Plain Model

A 4-round (black-box) OT protocol in the plain model from the decisional CSIDH assumption can be built. The OT protocol can be round-optimal, simulation-secure against malicious adversaries, and can be built in a generic manner from any statically sender-private (SSP) OT protocol with a perfect correctness. SSP OT protocol with a perfect correctness and simulation security against malicious adversaries can be based on other assumptions such as Learning With Errors, Decisional Diffie Hellman, Quadratic Residuosity, and $N^{th}$-residuosity. Additionally, the 4-round OT protocol achieving simulation security in the plain model can be from any isogeny-based assumptions.

The four-round oblivious transfer (OT) protocol in the plain model can be formally defined. A four-round OT protocol in the plain model of a tuple of five algorithms of the form $OT=(OTR_1, OTS_1, OTR_2, OTS_2, OTD)$ can be described below.

$OTR_1(1^\kappa, b)$: Given $\kappa$ and a bit $b \in 0,1$, output message $ot_1$ and (secret) receiver state $st_R$.

$OTS_1(1^\kappa, (m_0, m_1), ot_1)$: Given $\kappa$, a pair of strings ($m_0$, $m_1$), and a message $ot_1$, output message $ot_2$ and (secret) sender state $st_S$.

$OTR_2(st_R, ot_2)$: Given receiver state $st_R$ and a message $ot_2$, output message $ot_3$ and an updated receiver state $st_R$.

$OTS_2(st_S, ot_3)$: Given sender state $st_S$ and message $ot_3$, output message $ot_4$.

$OTD(st_R, ot_4)$: Given receiver state $st_R$ and message $ot_4$, output string m'.

A statistically sender private OT (SSP-OT) is an OT protocol where a receiver's choice bit b is computationally hidden from a corrupt sender and a message $m_{1-b}$ is statically hidden from a malicious receiver. A 2-round SSP-OT protocol, which has a specific kind of security notion, can be used to create a 4-round OT protocol with a stronger security notion. The SSP-OT can be constructed from various assumptions like decisional CSIDH, LWE, DDH, QR, DCR, etc.

The SSP-OT can be used in assumptions that are classical or quantum. For example, isogeny is one way to construct an SSP-OT. It could also be constructed from other assumptions such as lattice assumptions. The SSP OT can comprise three algorithms: OTR, OTS, and OTD. OTR can be an algorithm the receiver executes, OTS can be an algorithm that the sender executes, and OTD can be a final algorithm that allows the receiver to compute an OT string used to obtain a message $m_b$.

An SSP-OT can provide indistinguishability based security against malicious corruption of parties. However, the SSP-OT may not allow a simulator to extract the corrupt parties' inputs. To achieve simulation-based secure OT, two extra rounds can be added to enable input extraction of the corrupt parties (building a 4-round OT protocol by adding to a 2-round SSP-OT protocol as described above). This is performed by rewinding the adversarial party in simulation. This transformation can then allow a simulator to extract a corrupt receiver's input. At the same time, the choice bit can maintain indistinguishability against a malicious sender.

The two-round SSP-OT protocols in the plain model can be formally defined. The two-round SSP-OT can be a tuple of three PPT algorithms (OTR, OTS, OTD) that can satisfy correctness, receiver privacy, and statistical sender privacy as described below.

$OTR(1^\kappa, b)$: Given $\kappa$ and a bit $b \in 0,1$, outputs a message $ot_1$ and a (secret) receiver state st.

$OTS(1^\kappa, (m_0, m_1), ot_1)$: Given $\kappa$, a pair of strings ($m_0$, $m_1$), and a message $ot_1$, outputs a message $ot_2$.

OTD(st, $ot_2$): Given a secret state st and a message $ot_2$, it outputs a bit m'∈0,1.

The receiver privacy can be have a following property: if $(ot_1, st) \leftarrow_R OTR(1^\kappa, 0)$ and $(ot'_1, st') \leftarrow_R OTR(1^\kappa, 1)$ be the receiver's output on 0 and 1 respectively, then $$ot_1 \overset{c}{\approx} ot'_1.$$

The statistical sender privacy can have a following property: There exists a bit b∈0,1 such that for any message ot_1 and any two pairs of strings (m_0,m_1) and (m'_0,m'_1) such that m_b=m'_b, then $$OTS(1^\kappa, (m_0, m_1), ot_1) \overset{s}{\approx} OTS(1^\kappa, (m'_0, m'_1), ot_1).$$

Figure 6:
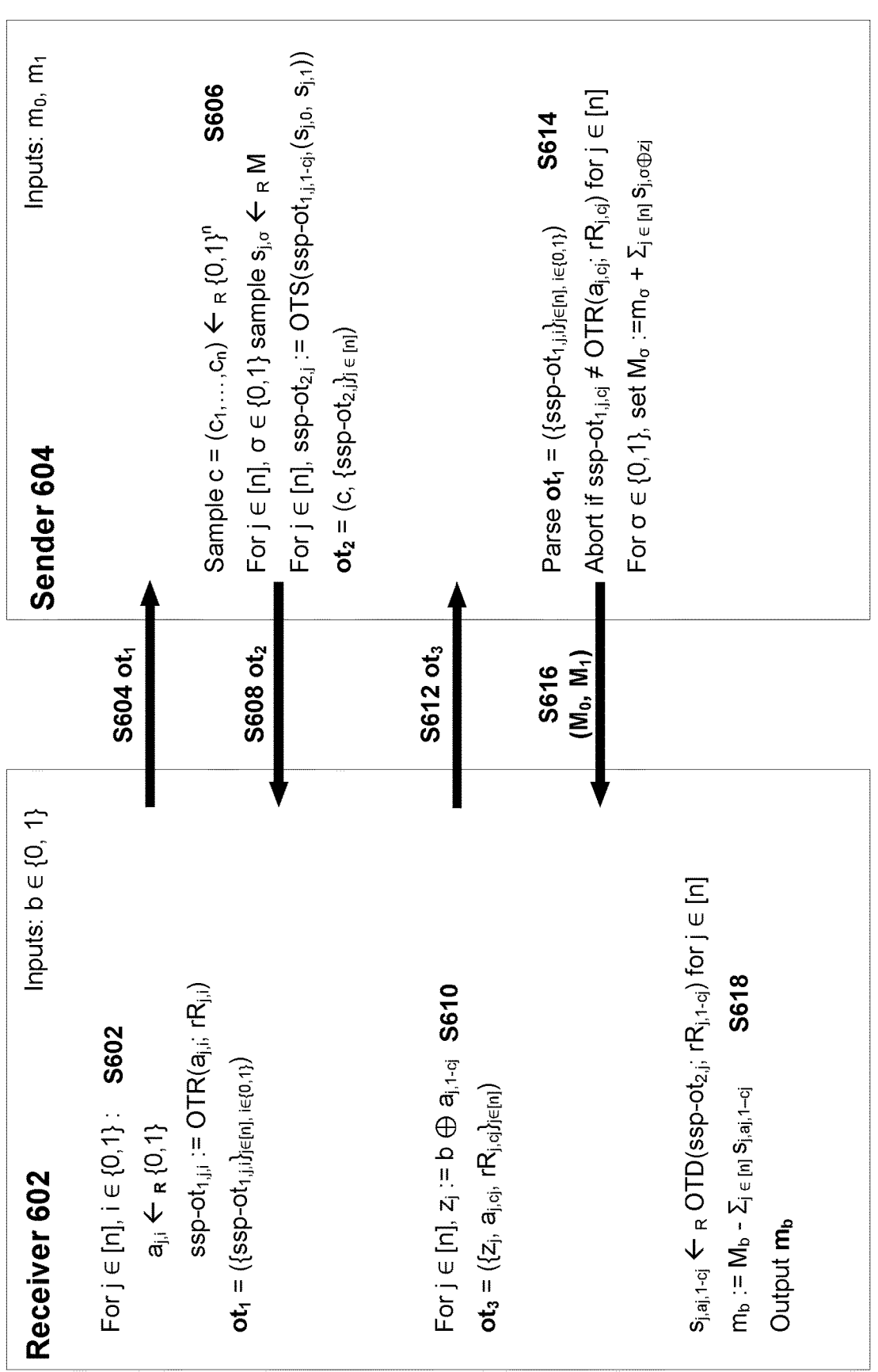
FIG. 6 shows a message flow diagram illustrating four-round statistically sender-private (SSP) oblivious transfer between a sender and a receiver.
Figure 10:
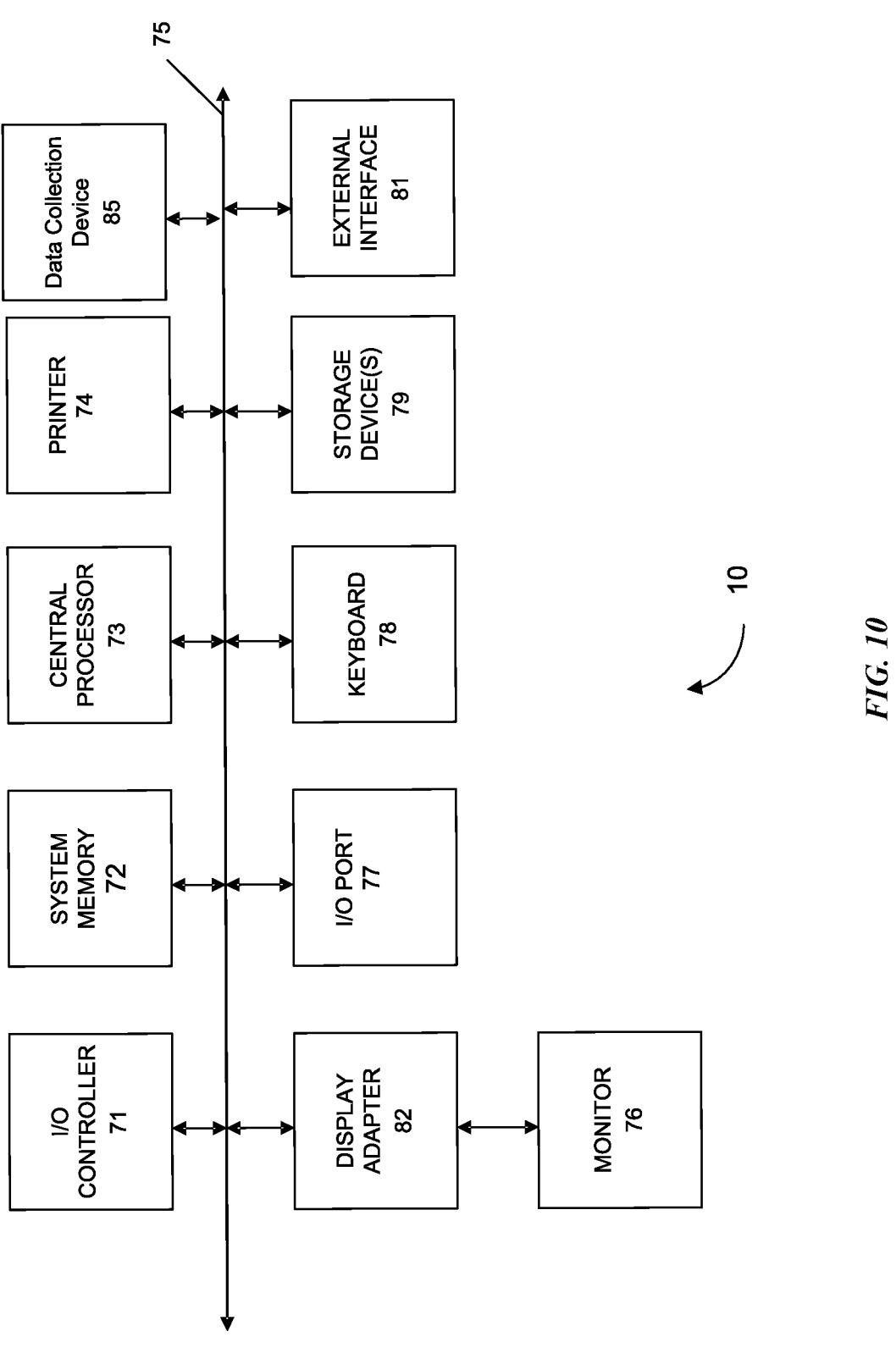
FIG. 10 shows a block diagram of an example device system usable with systems and methods according to embodiments of the present disclosure.

FIG. 6 shows a statistically sender private oblivious transfer based on decisional CSIDH assumption. At the high level, there is a four-round or four-message protocol between a receiver 602 and a sender 604, where the first message is from the receiver 602 to the sender 604, the second message is from the sender 604 to the receiver 602, the third message is from the receiver 602 to the sender 604, and the fourth message is from the sender 604 to the receiver 602. Any process that runs sequentially (e.g., a process that runs in a for loop "For j∈ [n], i∈ {0,1}" in step S602 of FIG. 6) can run in a parallel manner.

The receiver 602 has a choice bit b and the sender 604 has messages $m_0$ and $m_1$. At the end of receiving the message, the receiver 602 can complete the protocol and recover one of the messages $m_b$ in accordance with the choice bit b. The construction can also be represented as the format of four-round oblivious transfer (OT) protocol in the plain model with a tuple of five algorithms ($OTR_1$, $OTS_1$, $OTR_2$, $OTS_2$, OTD). A first algorithm (OTR), a second algorithm (OTS), and a third algorithm (OTD) can be a tuple of three algorithms (OTR, OTS, OTD) of the two-round SSP-OT protocol.

The tuple of three algorithms (OTR, OTS, OTD) can be instantiations of perfectly two-round SSP-OT from decisional CSIDH [Navid Alamati, Luca De Feo, Hart Montgomery, and Sikhar Patranabis. Cryptographic group actions and applications. In *ASIACRYPT* 2020. *Part II*, LNCS, pages 411-439. Springer, Heidelberg, December 2020.], Learning With Errors (LWE) [Zvika Brakerski and Nico Döttling. Two-message statistically sender-private OT from LWE. In Amos Beimel and Stefan Dziembowski, editors, *TCC* 2018. *Part II*, volume 11240 of *LNCS*, pages 370-390. Springer, Heidelberg, November 2018.], Decisional Diffie Hellman (DDH) [Moni Naor and Benny Pinkas. Efficient oblivious transfer protocols. In S. Rao Kosaraju, editor, 12*th SODA*, pages 448-457. ACM-SIAM, January 2001.], Quadratic Residuosity (QR) [Shai Halevi and Yael Tauman Kalai. Smooth projective hashing and two-message oblivious transfer. *Journal of Cryptology*, 25 (1): 158-193, January 2012.], and Nth-residuosity [Shai Halevi and Yael Tauman Kalai. Smooth projective hashing and two-message oblivious transfer. *Journal of Cryptology*, 25 (1): 158-193, January 2012.].

In step S602, the receiver 602 can generate a random choice bit $a_{j,i}$ and a randomness tape $rR_{j,i}$. The randomness tape $rR_{j,i}$ can be a string of random bits. The receiver 602 can then determine a first SSP-OT message ssp-$ot_{1,j,i}$ using the first algorithm (OTR) on the random choice bit $a_{j,i}$ and the randomness tape $rR_{j,i}$ for every j in n and for i in a bit set {0,1}. The n can be a value related to a security parameter. $2^{-n}$ can be negligible in the security parameter. Therefore, total of 2n random choice bits $\{a_{j,i}\}_{j\in [n],\ i\in \{0,1\}}$, 2n randomness tapes $\{rR_{j,i}\}_{j\in [n],\ i\in \{0,1\}}$, and 2n first SSP-OT messages $\{ssp-ot_{1,j,i}\}_{j\in [n],\ i\in \{0,1\}}$ can be generated. Half, or n, of the 2n random choice bits $\{a_{j,i}\}_{j\in [n],\ i\in \{0,1\}}$, the 2n randomness tape $\{rR_{j,i}\}_{j\in [n],\ i\in \{0,1\}}$, and the 2n first SSP-OT message $\{ssp-ot_{1,j,i}\}_{j\in [n],\ i\in \{0,1\}}$ can later be used by the sender 604 to check that the receiver 602 generated these values honestly while the other half are used by the sender 604 to mask the messages $m_0$ and $m_1$. More of this is described in later steps. The receiver 602 can then generate a first oblivious transfer message $ot_1$ comprising the 2n first SSP-OT messages $\{ssp-ot_{1,j,i}\}_{j\in [n],\ i\in \{0,1\}}$. This step can correspond to the $OTR_1(1^k, b)$ algorithm with the first oblivious transfer message $ot_1$.

In step S604, the receiver 602 can send the first oblivious transfer message $ot_1$ to the sender 604.

In step S606, the sender 604 can generate a challenge c. The challenge c can comprise a collection of n random challenge bits $(c_1, \ldots, c_n)$. The sender 604 can generate a random string $s_{j,\sigma}$ with the same length as messages ($m_0$ and $m_1$). The random string $s_{j,\sigma}$ can be generated for every j in n and for σ in a bit set {0,1}. Therefore, total of 2n random messages $\{s_{j,\sigma}\}_{j\in [n],\ o\in \{0,1\}}$ can be generated. The sender 604 can determine a second SSP-OT message ssp-$ot_{2,j}$ by using the second algorithm (OTS) on a first SSP-OT message ssp-$ot_{1,j,1-cj}$ and a pair of random messages ($s_{j,0}$, $s_{j,1}$) for every j in n. Therefore, total of n second SSP-OT messages $\{ssp-ot_{2,j}\}_{j\in [n]}$ can be determined by using n first SSP-OT messages $\{ssp-ot_{1,j,1-cj}\}_{j\in [n]}$ and n pairs of random messages $\{(s_{j,0}, s_{j,1})\}_{j\in [n]}$.

The n first SSP-OT message $\{ssp-ot_{1,j,1-cj}\}_{j\in [n]}$ can be messages among the 2n first SSP-OT messages $\{ssp-ot_{1,j,i}\}_{j\in [n],\ i\in \{0,1\}}$ with the i having the value of a bit that doesn't correspond to a challenge bit $c_j$ ($1-c_j$). The n pairs of random messages $\{(s_{j,0}, s_{j,1})\}_{j\in [n]}$ can be random messages among the 2n random messages $\{s_{j,\sigma}\}_{j\in [n],\ i\in \{0,1\}}$ with the first of the pair $s_{j,0}$ having the σ equal to 0 and the second of the pair $s_{j,1}$ having the σ equal to 1. Each of the pair of n random messages $\{(s_{j,0}, s_{j,1})\}_{j\in [n]}$ can be used later by the sender 604 to mask the messages $m_0$ and $m_1$. More of this is described in later steps. The sender 604 can then generate a second oblivious transfer message $ot_2$ comprising the challenge c and a second SSP-OT messages $\{ssp-ot_{2,j}\}_{j\in [n]}$. This step can correspond to the $OTS_1(1^k, (m_0,m_1),ot_1)$ algorithm with the second oblivious transfer message $ot_2$.

In step S608, the sender 604 can send the second oblivious transfer message $ot_2$ to the receiver 602.

In step S610, the receiver 602 can determine a mask bit $z_j$. The mask bit $z_j$ can be determined by using a first invertible function (e.g., XOR) on a choice bit b and a random choice bit $a_{j,1-cj}$ for every j in n. Therefore, total of n mask bits $\{z_j\}_{j\in [n]}$ can be determined by using the choice bit b and n random choice bits $\{a_{j,1-cj}\}_{j\in [n]}$. The n random choice bits $\{a_{j,1-cj}\}_{j\in [n]}$ can be random choice bits among the 2n random choice bits $\{a_{j,i}\}_{j\in [n],\ i\in \{0,1\}}$ with i having the value of a bit that doesn't correspond to the challenge bit $c_j$ ($1-c_j$). The receiver 602 can then generate a third oblivious transfer message $ot_3$ comprising the mask bit $z_j$, the random choice bit $a_{j,cj}$, and the randomness tape $rR_{j,cj}$ for every j in n. Therefore, the third oblivious transfer message $ot_3$ can comprise n mask bits $\{z_j\}_{j\in [n]}$, n random choice bits $\{a_{j,cj}\}_{j\in [n]}$, and n randomness tapes $\{rR_{j,cj}\}_{j\in [n]}$ ($\{z_j, a_{j,cj}, rR_{j,cj}\}_{j\in [n]}$). The n random choice bits $\{a_{j,cj}\}_{j\in [n]}$ can be random choice bits among the 2n random choice bits $\{a_{j,i}\}_{j\in[n]}$, $i\in\{0,1\}$ with i having the value of a the challenge bit $c_j$. The n randomness tapes $\{rR_{j,cj}\}_{j\in[n]}$ can be randomness tapes among the 2n randomness tapes $\{rR_{j,i}\}_{j\in[n],\ i\in\{0,1\}}$ with i having the value of the challenge bit $c_j$. This step can correspond to the $OTR_2(st_R,\ ot_2)$ algorithm with the third oblivious transfer message $ot_3$.

In step S612, the receiver 602 can send the third oblivious transfer message $ot_3$ to the sender 604.

In step S614, the sender 604 can parse the first oblivious transfer message $ot_1$ that contains 2n first SSP-OT messages $\{ssp\text{-}ot_{1,j,i}\}_{j\in[n],\ i\in\{0,1\}}$. The sender 604 can then reconstruct the first SSP-OT message using the first algorithm on a random choice bit $a_{j,cj}$ and a randomness tape $rR_{j,cj}$ for every j in n. The reconstructed message can then be compared with the first SSP-OT message $ssp\text{-}ot_{1,j,cj}$ of the first oblivious transfer message $ot_1$ for every j in n. Therefore, total of n reconstructed messages can be compared with n first SSP-OT messages $\{ssp\text{-}ot_{1,j,cj}\}_{j\in[n]}$. The n first SSP-OT message $\{ssp\text{-}ot_{1,j,i}\}_{j\in[n]}$ can be messages among the 2n first SSP-OT messages $\{ssp\text{-}ot_{1,j,i}\}_{j\in[n],\ i\in\{0,1\}}$ with the i having the value of the challenge bit $c_j$. If any of the first SSP-OT messages $ssp\text{-}ot_{1,j,cj}$ does not match with the corresponding reconstructed message for every j in n, then the operation aborts.

The reason for checking the first SSP-OT message $ssp\text{-}ot_{1,j,cj}$ with the reconstructed message is to check whether the receiver 602 has generated the first SSP-OT messages honestly since the sender 604 does not know if the receiver 602 manipulated the first SSP-OT messages. Since there are n challenge bits $\{c_j\}_{j\in[n]}$, half of the 2n first SSP-OT messages $\{ssp\text{-}ot_{1,j,i}\}_{j\in[n],\ i\in\{0,1\}}$ are opened and checked by the sender 604 to verify that the receiver 602 generated the first SSP-OT messages honestly (by comparing with reconstructed messages). By verifying the first SSP-OT messages $\{ssp\text{-}ot_{1,j,cj}\}_{j\in[n]}$, the sender 604 can be confident that the receiver 602 did not manipulate the 2n first SSP-OT messages $\{ssp\text{-}ot_{1,j,i}\}_{j\in[n],\ i\in\{0,1\}}$.

Once the n first SSP-OT messages $\{ssp\text{-}ot_{1,j,cj}\}_{j\in[n]}$ are checked, then the sender 604 can mask both messages $m_0$ and $m_1$. For every σ in a set $\{0,1\}$, A masked message $M_σ$ can be determined by using a second invertible operation on the message $m_σ$ and a summation of a random message $s_{j,σ\oplus zj}$ for every j in n. The sender 604 can mask both messages $m_0$ and $m_1$ as it does not know the choice bit b of the receiver 602. Therefore, the sender 604 can set a message bit σ for both 0 and 1 to determine masked messages $M_0$ and $M_1$. For every j in n, the random string $s_{j,σ\oplus zj}$ can be chosen among the 2n random strings $\{s_{j,σ}\}_{j\in[n],\ σ\in\{0,1\}}$ for σ having a value determined using the first invertible operation on the message bit σ and the mask bit $z_j$.

For the message bit σ that corresponds to the choice bit b (σ=b) of the receiver 602, the sender 604 can compute the random choice bit $a_{j,1-cj}$ when performing the first invertible operation on the message bit σ and the mask bit $z_j$. This is because the mask bit $z_j$ can be determined by using the first invertible function on the choice bit b and the random choice bit $a_{j,1-cj}$ (step S610). Therefore, for the masked message $M_σ$ with the message bit σ that corresponds to the choice bit b, the sender 604 would be using a summation of n random messages $\Sigma_{j\in[n]}\ s_{j,x}$, where x is $a_{j,1-cj}$, to mask the message $m_0$. This summation of n random messages $\Sigma_{j\in[n]}\ s_{j}x$ can be reconstructed by the receiver 602, which is described more in later steps. However, for the message bit σ that doesn't correspond to the choice bit b (σ=1–b) of the receiver device, the first invertible operation on the message bit σ and the mask bit $z_j$ results in a random value that the receiver 602 cannot recover, thereby hiding the message $m_{1-b}$ from the receiver 602.

Additionally, by performing a summation of all the n random messages $\Sigma_{j\in[n]}\ S_{j\cdot σ\oplus zj}$, the receiver 602 is being prevented from maliciously learning the other message $m_{1-b}$, as the receiver 602 would have to know all n random messages $\{s_{j,(1-b)\oplus zj}\}_{j\in[n]}$ (where σ is bit 1–b for $m_{1-b}$) to determine a summation that is used to mask the message $m_{1-b}$. There is no incentive for the receiver 602 to maliciously learn the random message $s_{j,(1-b)\oplus zj}$ as maliciously learning all n random messages $\{s_{j,(1-b)\oplus zj}\}_{j\in[n]}$ to determine a summation that is used to mask the other message $m_{1-b}$ would require sacrificing the knowledge of learning n random messages $\{s_{j,b\oplus zj}\}_{j\in[n]}$ to determine a summation that is used to mask the message $m_b$. Maliciously learning only some of n random messages $\{s_{j,(1-b)\oplus zj}\}_{j\in[n]}$ of the other message $m_{1-b}$ would lead to discovering only some of n random messages $\{s_{j,b\oplus zj}\}_{j\in[n]}$ of the message $m_b$, which would result in the receiver 602 not being able to find a full summation value of neither messages $m_b$ and $m_{1-b}$. Therefore, the summation can provide extra level of security in which the sender 604 can assure that the receiver 602 cannot de-mask the other message $m_{1-b}$. This step can correspond to the $OTS_2(st_S,\ ot_3)$ algorithm with a fourth oblivious transfer message $ot_4=(M_0,\ M_1)$.

In step S616, the sender 604 can send masked messages $M_0$ and $M_1$, or the fourth oblivious transfer message $ot_4$ to the receiver 602.

In step S618, the receiver 602 can use the third algorithm (OTD) on the second SSP-OT message $ssp\text{-}ot_{2,j}$ (received in step S608) and the randomness tape $rR_{j,1-cj}$ to determine the random messages $s_{j,x}$, where x is $a_{j,1-cj}$, for j in n. Therefore, total of n random messages $\{s_{j,x}\}_{j\in[n]}$ can be determined using n second SSP-OT messages $\{ssp\text{-}ot_{2,j}\}_{j\in[n]}$ and n randomness tapes $\{rR_{j,1-cj}\}_{j\in[n]}$. The n randomness tapes $\{rR_{j,1-cj}\}_{j\in[n]}$ can be randomness tapes among the 2n randomness tapes $\{rR_{j,i}\}_{j\in[n],\ i\in\{0,1\}}$ with i having the value of a bit that doesn't correspond to the challenge bit $c_j$ ($1-c_j$). The receiver 602 can then select the masked message $M_b$ that corresponds to its choice bit b, and use the second invertible function on the masked message $M_b$ and the summation of the random messages $s_{j,x}$ for every j in n to de-mask the masked message $M_b$. Upon de-masking the masked message $M_b$, the receiver 602 can access the message $m_b$. This step can correspond to the OTD ($st_R,\ ot_4$) algorithm with an output of $m_b$.

The choice bit indistinguishability of the SSP-OT and the fact that the SSP-OT choice bit (i.e., random choice bit a) masks the actual choice bit b of the receiver can imply choice bit indistinguishability for the four round OT. A simulation strategy can rely on the perfect correctness of SSP-OT in the following way. When the receiver opens the randomness tape and choice bit b of an SSP-OT, the perfect correctness can imply that the receiver will learn the SSP-OT string (i.e., random string s) corresponding to the choice bit b (i.e., message $m_b$). Thus, by the statistical sender privacy, the other SSP-OT string will therefore be statistically hidden.

VI. 3-Round OT Extension Protocol

Oblivious transfer is used extensively in protocols for secure computation such as in the settings of multi-party computation. As secure computation becomes more practical, a large scale oblivious transfer protocols ranging up to several millions of oblivious transfers can be run. However, running several millions of full OT protocol can be expensive and time consuming. In order to solve this issue, an OT protocol extension can be used.

An OT protocol extension can be a method to perform many OTs in a more efficient way by using a single or a small number of base OTs that are used as a base for obtaining many OTs via the use of cheap symmetric cryptographic operations instead of running full OT protocols for each OTs. By using OT protocol extension, exchanging future messages requiring OTs can be done efficiently. An example of using OT protocol can be later described in FIG. 7.

From the point of view of cryptographic applications, EGA can be an abstraction that captures the CSI-Fish family of isogenies, where the group action operation * can be computed efficiently for any element g in the group G. However, this is not the case for the CSIDH family of isogenies: the group action operation * can be efficiently for "certain" elements in the group G (more specifically, a generating set of small cardinality). To model such families of isogenies, a weaker or restricted variant of EGA (abbreviated throughput as REGA) can be introduced.

The embodiment can build a UC-secure, 3-round OT protocol extension in the random oracle model. This OT protocol extension can yield the first secure OT extension protocol from the reciprocal CSIDH assumption in the framework of (R)EGA. This assumption is known to be quantum-equivalent to the computational CSIDH assumption, and does not have an analogue in the Diffie-Hellman setting. The construction of the embodiment relies on crucially on the quadratic twist of an elliptic curve, which can be computed efficiently in the CSIDH setting.

An abstraction of the quadratic twist can be presented.

Let $(G, X, *)$ be an EGA (equivalently an REGA) as described above. A "twist" as a map $\mathcal{T}: X \rightarrow X$ that satisfies the following properties can be defined.

For any $g \in G$ and any $x \in X$ we have $\mathcal{T}(g*x)=g^{-1}*\mathcal{T}(x)$.

For any $x \in X$ and any uniform $g \leftarrow_R G$, we have: $g*x \approx s \mathcal{T}(g*x)$.

There exists a "twist-invariant" element $x_0 \in X$ such that $\mathcal{T}(x_0)=x_0$.

FIG. 7 shows a UC-secure, 3-round OT protocol extension in the random oracle model. At the high level, there is a three-round or three-message protocol between the receiver 702 and the sender 704, where the first message is from the receiver 702 to the sender 704, the second message is from the sender 704 to the receiver 702, and the third message is from the receiver 702 to the sender 704. The receiver 702 can have choice bits b (or $\{b_i\}_{i \in [1]}$) as inputs. The receiver 702 can output choice bits b (or $\{b_i\}_{i \in [1]}$) and masking messages $a_b$ while the sender 704 can output masking messages $a_0$ and $a_1$. Any process that runs sequentially (e.g., a process that runs in a for loop "For $i \in [1]$" in step S702 of FIG. 6) can run in a parallel manner.

$(G, X, *)$ can be a EGA group operation with elliptic curve $x_0$ being a publicly available element in the set X where reciprocal EGA assumption can hold. A first hash function $H_1$ can map elliptic curve into a bit string of length k $(H_1 \rightarrow \{0,1\}^k)$, a second hash function $H_2$ can map bit string into a bit string of length k $(H_2: \{0,1\}^k \rightarrow \{0,1\}^k$, a third hash function $H_3$ can map a collection of 1 bit strings of length k into a bit string of length k $(H_3: \{0,1\}^k \rightarrow \{0,1\}^k)$, and a fourth hash function $H_4$ can map a collection of 2 bit strings of length k into a bit string of length k $(H_4: \{0,1\}^{2k} \rightarrow \{0,1\}^k)$.

Common reference string (CRS) 703 can provide public randomness that none of the two parties, the sender 704 and the receiver 702, can manipulate but has access to. CRS 703 can include a common reference string x that is determined from doing an isogeny mapping operation of an isogeny map g and a special elliptic curve $x_0$ such that a twist of the special elliptic curve can be itself. Performing the twist on an elliptic curve other than the special elliptic curve $x_0$ can result in a different elliptic curve. The isogeny map g can be sampled from a generator G.

In step S702, the receiver 702 can sample an isogeny map $r_i$ using a generator G. The receiver 702 can then determine an elliptic curve $z_i$. If a choice bit bi is equal to 0, then the elliptic curve $z_i$ can equal to an isogeny mapping operation of the isogeny map $r_i$ and the common reference string x. If the choice bit bi is equal to 1, then the elliptic curve $z_i$ can equal to a twist of an isogeny mapping operation of the isogeny map $r_i$ and the common reference string x. The receiver 702 can sample the isogeny map $r_i$ and determine the elliptic curve $z_i$ for every i in a specified number (denoted as 1) of OT protocols that can be performed using the OT extension protocol. For example, if 10 OT protocols need to be performed, then 1 can be 10. Therefore, there will be I elliptic curves z (or $\{z_i\}_{i \in [11]}$) determined by using 1 isogeny maps r (or $\{r_i\}_{i \in [11]}$) and the common reference string x. Once the receiver 702 determines the 1 elliptic curves z, the receiver 702 can generate a first oblivious transfer message $ot_1$ that includes the elliptic curves z and a receiver state $st_1$ including the choice bits b and the isogeny maps r. The specified number 1 can be associated with a security parameter.

In step S704, the receiver 702 can send the first oblivious transfer message $(ot_1)$ to the sender 704.

In step S706, the sender 704 can sample an isogeny map si using the generator G. The sender 704 can determine an elliptic curve $y_i$ by performing an isogeny mapping operation on the isogeny map $s_i$ and the common reference string x. The sender 704 can use the first hash function $H_1$ on a counter i and a first combined value to determine a masking message $p_{0,i}$. The first combined value can be determined by using the isogeny mapping operation on the isogeny map $s_i$ and the elliptic curve $z_i$. The first hash function $H_1$ can convert the elliptic curve into a bit string. The sender 704 can use the first hash function $H_1$ on the counter i and a second combined value to determine a masking message $p_{1,i}$. The second combined value can be determined by performing the isogeny mapping operation on the isogeny map $s_i$ and the twist of the elliptic curve $z_i$.

The sender 704 can use the second hash function $H_2$ on the counter i and the masking message $p_{0,i}$ to generate a message $u_{0,i}$. The second hash function $H_2$ takes bit strings as inputs and outputs bit strings. The sender 704 can use a second hash function $H_2$ on the counter i and the masking message $p_{1,i}$ to generate a message $u_{1,i}$. The masking messages $p_{0,i}$ and $p_{1,i}$ are converted to messages $u_{0,i}$ and $u_{1,i}$ for extra layer of security. The message $u_{0,i}$ and the message $u_{1,i}$ can then go through an XOR operation to generate a challenge $chall_i$.

The isogeny map $s_i$, the elliptic curve $y_i$, the masking message $a_{0,i}$, the masking message $a_{1,i}$, the message $u_{0,i}$, the message $u_{1,i}$, and the challenge $chall_i$ can be determined for every i in 1. Therefore, there can be 1 isogeny maps s (or $\{s_i\}_{i \in [11]}$), 1 elliptic curves y (or $\{y_i\}_{i \in [11]}$), 1 masking messages $p_0$ (or $\{a_{0,i}\}_{i \in [11]}$), 1 masking messages $p_1$ (or $\{a_{1,i}\}_{i \in [11]}$), 1 messages $u_0$ (or $\{u_{0,i}\}_{i \in [11]}$), 1 messages $u_i$ (or $\{u_{1,i}\}_{i \in [I]}$), and 1 challenges chall (or $\{chall_i\}_{i \in [11]}$) can be determined.

The sender 704 can then use the third hash function $H_3$ on a collection of the messages $u_0$ $(u_{0,1}, u_{0,2}, \ldots, u_{0,1})$ to generate a response ans. The third hash function $H_3$ can take a collection of bit strings and output a single bit string. The response ans can then go through the second hash function $H_2$ to determine a proof pf. The ans and pf can be later used by the receiver 702 to verify that it generated correct masking messages m (or $\{m_i\}_{i \in [1]}$). This is described in later steps. The sender 704 can generate a second oblivious transfer message $ot_2$ comprising the elliptic curves y, responses chall, and the proof pf to the receiver 702, and a sender state $st_2$ including the response ans.

In step S708, the sender 704 can send the second oblivious transfer message $ot_2$ to the receiver 702.

In step S710, the receiver 702 can parse the receiver state $st_1$ comprising choice bits b and the isogeny maps r, and the second oblivious transfer message $ot_2$ comprising the elliptic curves y, the challenges chall, and the proof pf. The receiver 702 can then generate a masking message $p_{bi,i}$ using the first hash function $H_1$ on the isogeny mapping operation of the isogeny map $r_i$ and the elliptic curve $y_i$. The masking message $p_{bi}$ can either have the value of the masking message $p_{0,i}$ or $p_{1,i}$ depending on the choice bit b. Since the elliptic curve $y_i$ is determined by performing an isogeny mapping operation on the isogeny map $s_i$ and the elliptic curve x, by reordering the isogeny mapping operation of the isogeny map $r_i$, isogeny map $s_i$, and the elliptic curve x, either the masking message $p_{0,i}$ or the masking message $p_{1,i}$ can be reconstructed depending on the choice bit b. For example, if the choice bit b is 0, then it can reconstruct the masking message $p_{0,i}$. If the choice bit is 1, then it can reconstruct the masking message $p_{1,i}$.

The receiver 702 can then perform a numerical multiplication on a response $chall_i$ and a bit $b_i$. For example, if bit $b_i$ is equal to 1, then the numerical multiplication of the response $chall_i$ and the bit $b_i$ can result in just the response $chall_i$. If bit $b_i$ is equal to 0, then the numerical multiplication of the response $chall_i$ and the bit $b_i$ can result in bit string 0. The second hash function on the masking message $p_{bi}$ can be either the message $u_{0,i}$ or the $u_{1,i}$ depending on the choice bit $b_i$.

If the bit $b_i$ is equal to 0, the numerical multiplication of the response $chall_i$ and the bit $b_i$ can result in a bit string of just zero, and the second hash function on the masking message $p_{bi}$ can be determined to be the message $u_{0,i}$. A message $u_i'$ can be determined by performing an XOR operation on the bit string of zero and the message $u_{0,i}$. The message $u_i'$ can result in the message $u_{0,i}$ since any value XOR'd with zero is left unchanged.

If the bit $b_i$ is equal to 1, the numerical multiplication of the response $chall_i$ and the bit $b_i$ can result in a bit string of the response $chall_i$, and the second hash function on the masking message $p_{bi}$ can be determined to be the message $u_{1,i}$. The message $u_i'$ can be determined by performing an XOR operation on the bit string of the response $chall_i$ and the message $u_{1,i}$. Since the response $chall_i$ is determined by performing an XOR operation on the message $u_{0,i}$ and the message $u_{1,i}$, another XOR operation of $u_{1,i}$ on the $chall_i$ can cancel the $u_{1,i}$ values. Therefore, the message $u_i'$ can result in the message $u_{0,i}$.

The masking message $p_{bi}$ and the message $u_i'$ can be determined for every i in 1. Therefore, there can be 1 masking messages $p_{bi}$ (or $\{p_{bi,i}\}_{i \in [1]}$) and 1 messages u' (or $\{u_i\}_{i \in [1]}$) can be determined.

Once the messages u' are determined, a collection of all messages u' ($u_1'$, $u_2'$, ..., $u_1'$) can be used on the third hash function to determine an answer ans'. The ans' can then go through the second hash function $H_2$ to determine if it is equal to the proof pf of the second oblivious transfer message $ot_2$. If they are equivalent, then the receiver 702 can generate a third oblivious transfer message $ot_3$ including the answer ans'. The receiver 702 can then determine a masking message $a_{bi,i}$ for every i in 1. The masking message $a_{bi,i}$ can be determined by using a fourth hash function $H_4$ on the answer ans' and the masking message $p_{bi,i}$. Therefore, a specified number (denoted by character 1) masking messages $a_b$ (or $\{a_{bi,i}\}_{i \in [1]}$) can be determined. The receiver 702 can then output masking messages $a_b$ and the choice bit b.

In step S712, the receiver 702 can send the third oblivious transfer message $ot_3$ to the sender 704.

In step S714, the sender 704 can parse the third oblivious transfer message $ot_3$ comprising the answer ans'. The sender 704 can then check if the answer ans' in the third oblivious transfer message $ot_3$ is equal to the answer ans in the sender state $st_2$. If they are equivalent, then the sender 704 can determine masking messages $a_{0,i}$ and $a_{1,i}$ for every i in 1. The masking message $a_{0,i}$ can be determined by using the fourth hash function on the answer ans and the masking message $p_{0,i}$. The masking message $a_{1,i}$ can be determined by using the fourth hash function on the answer ans and the masking message $p_{1,i}$. The sender 704 can then output the masking messages $a_0$ (or $\{a_{0,i}\}_{i \in [1]}$) and $a_1$ (or $\{a_{1,i}\}_{i \in [1]}$).

The receiver 702 can use the masking messages $a_b$ while the sender 704 can use the masking messages $a_0$ and $a_1$ as a building block to build OT extension. Since each of the masking message $a_{bi,i}$ corresponds to one of the masking messages $a_{0,i}$ and $a_{1,i}$ according to the choice bits $b_i$, the oblivious transfer can be performed in a simple symmetric cryptographic operation. For example, when performing a OT transfer with the sender 704 having input messages $q_0$ and $q_1$, instead of going through a full OT transfer, the sender 704 can use the masking messages $a_{0,i}$ and $a_{1,i}$ on the messages $q_0$ and $q_1$ respectively (via using an invertible function) to create masked messages $Q_0$ and $Q_1$, and send it to the receiver 702. Since the receiver 702 already knows the masking message $a_{bi,i}$ for the input bit $b_i$ it chose from the extension, the receiver 702 can decrypt the masked message $Q_b$ using the masking message $a_{bi,i}$ to obtain the message $q_{bi}$ of the input bit $b_i$. For each i OT protocol in 1 OT protocols, the masking message $a_{bi,i}$ and the masking messages $a_{0,i}$ and $a_{1,i}$ can be used to perform OT protocol.

It can be observed that the sender 704 can reuse the isogeny map s for multiple OT protocols by reusing the same elliptic curve y for all the OT protocols. This can translate into a poly(K) loss in the security parameter, where k is the length of the security parameter. The security loss by reusing the isogeny map s and the elliptic curve y can be compensated by increasing the security parameter accordingly. This optimization can reduce the number of isogeny computations to 4 for each OT.

VII. Two Round Oblivious Transfer from Isogenies

Methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. The semi-honest secure oblivious transfer implementation in FIG. 4 and the malicious secure oblivious transfer implementation in FIG. 5 may be carried out using the aspect methods disclosed in greater detail with reference to FIGS. 8 and 9.

A. Receiver Device

FIG. 8 shows a flow chart for performing a two-round OT protocol from the computational CSIDH assumption. The method 800 shows a receiver device (e.g., a client computing device 140) requesting, from the sender device having a first message $m_0$ and a second message $m_1$, a third message $m_b$ of the input value b from the sender device (e.g., a server computing device 180). The two-round OT protocol can be semi-honest secure protocol as described in FIG. 4 or malicious secure protocol as described in FIG. 5.

In step S802, the receiver device can store an input value b. The input value b can be a choice bit having a value of 0 or 1. The receiver device can select the choice bit prior to performing the oblivious transfer protocol. The input value b can be used by the receiver device later to select the third message $m_b$ according to the input value b.

In step S804, the receiver device can obtain a common reference string $x_b$. The common reference string $x_b$ can be a public randomness generated by a trusted authority that none of the two parties, a sender device and the receiver device, can manipulate but only access it. The common reference string $x_b$ can be either equivalent to a first common reference string $x_0$ or second common reference string $x_1$ depending on the choice bit b. This operation performed by the receiver device in step S804 may correspond in part to step S402 of the semi-secure OT protocol and step S502 of the malicious OT protocol.

In step S806, the receiver device can sample a first random isogeny map r using a generator G. This operation performed by the receiver device in step S806 may correspond in part to step S402 of the semi-secure OT protocol and step S502 of the malicious OT protocol.

In step S808, the receiver device can generate a first elliptic curve z using the first random isogeny map r and the common reference string $x_b$. The receiver device generates the first elliptic curve z by performing an isogeny mapping operation on the first random isogeny map r and the common reference string $x_b$. In the case of a malicious secure oblivious transfer protocol, the receiver device can compute a non-interactive zero-knowledge proof of knowledge (NIZKPOK) proof pf using the input value b and the first elliptic curve z. The NIZKPOK proof pf can guarantee that the receiver device cannot change the input value b and the first elliptic curve z after computing the NIZKPOK proof pf. This operation performed by the receiver device in step S808 may correspond in part to step S402 of the semi-secure OT protocol and step S502 of the malicious OT protocol.

In step S810, the receiver device can transmit the first elliptic curve z to the sender device. In the case of a malicious secure OT protocol, the receiver device can transmit the NIZKPOK proof pf to the sender device. This operation performed by the receiver device in step S810 may correspond to step S404 of the semi-secure OT protocol and step S504 of the malicious OT protocol.

In step S812, the receiver device can receive a second elliptic curve $y_0$, a third elliptic curve $y_1$, a first masked message $c_0$, and a second masked message $c_1$ from the sender device. The first masked message $c_0$ can be generated using the first message $m_0$, and the second masked message $c_0$ can be generated using the second message $m_1$. The receiver device can later choose a third masked message $c_b$ and a fourth elliptic curve $y_b$ that corresponds to the input value b. The masked message $c_b$ can be de-masked to obtain the third message $m_b$ using the fourth elliptic curve $y_b$ in later steps. In the case of a malicious secure OT protocol, the sender device may have verified the NIZKPOK proof pf. This operation performed by the receiver device in step S812 may correspond to step S406 of the semi-secure OT protocol and step S506 of the malicious OT protocol.

In step S814, the receiver device can generate a hash output using a hash function H that can operate on a combined value of the first random isogeny map r and the fourth elliptic curve $y_b$. The fourth elliptic curve $y_b$ can either be the second elliptic curve $y_0$ or the third elliptic curve $y_1$ depending on the input value b. This operation performed by the receiver device in step S814 may correspond in part to step S408 of the semi-secure OT protocol and step S508 of the malicious OT protocol.

In step S816, the receiver device can generate a third message $m_b$ by combining a third masked message $c_b$ with the hash output generated in step S814 using an invertible function. The third masked message $c_0$ can be either the first masked message $c_0$ or the second masked message $c_1$ depending on the input value b. The third message $m_b$ can either be the first masked message $m_0$ or the second masked message $m_1$ depending on the input value b. This operation performed by the receiver device in step S816 may correspond in part to step S408 of the semi-secure OT protocol and step S508 of the malicious OT protocol.

The receiver device can, upon generating the third message $m_b$ according to the choice bit b, can receive an encrypted program from the sender device. The sender device can execute the encrypted program using the third message $m_b$ and obtain an encrypted output value. The receiver device can then send the encrypted output value to the sender device, wherein the sender device can decrypt the output value using the third message $m_b$, as the sender device has both the first message $m_0$ and the second message $m_1$.

B. Sender Device

FIG. 9 shows a flow chart for performing a two-round OT protocol from the computational CSIDH assumption. The method 800 can show a sender device (e.g., a server computing device 180) sending a first masked message $c_0$ corresponding to a first message $m_0$ and a second masked message $c_1$ corresponding to a second message $m_1$ to a receiver device. The receiver device can then de-mask a third masked message $c_b$ corresponding to either the first masked message $c_0$ or the second masked message $c_1$ to obtain a third message $m_b$ according to the receiver's input value b. The two-round OT protocol can be semi-honest secure protocol as described in FIG. 4 or malicious secure protocol as described in FIG. 5.

In step S902, the sender device can store the first message $m_0$ and the second message $m_1$. These messages can be stored by the sender device prior to the oblivious transfer. The receiver device can choose the third message $m_b$ among the first message $m_0$ and the second message $m_1$ according to the input value b using the oblivious transfer.

In step S904, the sender device can receive a first elliptic curve z that was generated using a first random isogeny map r by the receiver device. In the case of a malicious secure OT protocol, the sender device can additionally receive a NIZKPOK proof pf generated by using the first elliptic curve z. The operation performed in step S904 can correspond in part to step S404 of the semi-secure OT protocol and step S504 of the malicious OT protocol.

In step S906, the sender device can obtain a first common reference string $x_0$ and a second common reference string $x_1$. The first common reference string $x_0$ and the second common reference string $x_1$ can be public randomness generated by a trusted authority that none of the two parties, a sender device and the receiver device, can manipulate but only access it. The operation performed in step S906 can correspond in part to step S405 of the semi-secure OT protocol and step S505 of the malicious OT protocol.

In step S908, the sender device can sample a second random isogeny map $k_0$ and a third random isogeny map $k_1$ using a generator G. The operation performed in step S908 can correspond in part to step S405 of the semi-secure OT protocol and step S505 of the malicious OT protocol.

In step S910, the sender device can generate a second elliptic curve $y_0$ using the second random isogeny map $k_0$ and the first common reference string $x_0$. The second elliptic curve $y_0$ can be generated by performing an isogeny mapping operation on the second random isogeny map $k_0$ and the first common reference string $x_0$. The operation performed in step S910 can correspond in part to step S405 of the semi-secure OT protocol and step S505 of the malicious OT protocol.

In step S912, the sender device can generate a third elliptic curve $y_1$ using the third random isogeny map $k_1$ and the second common reference string $x_1$. The third elliptic curve $y_1$ can be generated by performing an isogeny mapping operation on the third random isogeny map $k_1$ and the second common reference string $x_1$. The operation performed in step S912 can correspond in part to step S405 of the semi-secure OT protocol and step S505 of the malicious OT protocol.

In step S914, the sender device can generate a first hash output using a hash function H that operates on a first combined value of the second random isogeny map $k_0$ and the first elliptic curve z. The first combined value can be generated by performing an isogney mapping operation on the second random isogney map $k_0$ and the first elliptic curve z. This operation performed by the receiver device in step S914 may correspond in part to step S405 of the semi-secure OT protocol and step S505 of the malicious OT protocol.

In step S916, the sender device can generate a second hash output using the hash function H that operates on a second combined value of the third random isogeny map $k_1$ and the first elliptic curve z. The second combined value can be generated by performing an isogney mapping operation on the third random isogney map $k_1$ and the first elliptic curve z.

This operation performed by the receiver device in step S916 may correspond in part to step S405 of the semi-secure OT protocol and step S505 of the malicious OT protocol.

In step S918, the sender device can generate a first masked message $c_0$ by combining the first message $m_0$ with the first hash output using an invertible function. The invertible function can be an XOR operation. This operation performed by the receiver device in step S918 may correspond in part to step S405 of the semi-secure OT protocol and step S505 of the malicious OT protocol.

In step S920, the sender device can generate a second masked message $c_1$ by combining the second message $m_1$ with the second hash output using the invertible function. The invertible function can be an XOR operation. This operation performed by the receiver device in step S920 may correspond in part to step S405 of the semi-secure OT protocol and step S505 of the malicious OT protocol. In the case of malicious secure OT protocol, after generating the second masked message $c_1$, the sender device can verify the NIZKPOK proof pf received from the receiver device. If the NIZKPOK proof pf does not verify, then the sender device can abort the OT protocol.

In step S922, the sender device can transmit the second elliptic curve $y_0$, the third elliptic curve $y_1$, the first masked message $c_0$, and the second masked message $c_1$ to the receiver device. The receiver device would then be able to use a fourth elliptic curve $y_b$ having the value of either the second elliptic curve $y_0$ or the third elliptic curve $y_1$ to de-mask the third masked message $c_b$ according to the input value b. The third masked message $c_b$ can have the value of either the first masked message $c_0$ and the second masked message $c_1$, and upon de-masking the third masked message $c_b$, the receiver device can generate the third message $m_b$.

In additional to sending the second elliptic curve $y_0$, the third elliptic curve $y_1$, the first masked message $c_0$ and the second masked message $c_1$, the sender device can transmit an encrypted program to the receiver device. The receiver device can execute the encrypted program using the third message $m_b$ that it decrypted from the third masked message $c_b$, and generate an encrypted output value that it sends to the sender device. The sender device can receive the encrypted output value and decrypt the encrypted output value using a corresponding message to the third message $m_b$.

VIII. Computing System

Any of the computer systems mentioned herein may utilize any suitable number of subsystems. Examples of such subsystems are shown in FIG. 8 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or a network interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on." When a Markush group or other grouping is used herein, all individual members of the group and all combinations and subcombinations possible of the group are intended to be individually included in the disclosure.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method for performing a privacy-preserving multiparty computation, the method comprising performing, by a receiver device:

storing an input value b;

obtaining a common reference string $x_b$;

sampling a first random isogeny map r using a generator G;

generating a first elliptic curve z using the first random isogeny map r and the common reference string $x_b$;

transmitting the first elliptic curve z to a sender device;

receiving, from the sender device, a second elliptic curve $y_0$, a third elliptic curve $y_1$, a first masked message $c_0$, and a second masked message $c_1$, wherein the first masked message $c_0$ is generated using a first message $m_0$, and wherein the second masked message $c_0$ is generated using a second message $m_1$;

generating a hash output using a hash function H that operates on a combined value of the first random isogeny map r and a fourth elliptic curve $y_b$, wherein the fourth elliptic curve $y_b$ is either the second elliptic curve $y_0$ or the third elliptic curve $y_1$ depending on the input value b; and generating a third message $m_b$ by combining a third masked message $c_b$ with the hash output using an invertible function, wherein the third message $m_b$ is either the first masked message $m_0$ or the second masked message mi depending on the input value b, and wherein third masked message $c_b$ is either the first masked message $c_0$ or the second masked message $c_1$ depending on the input value b.

2. The method of claim 1, wherein the input value b that is to be used in executing an encrypted program, the method further comprising:

executing the encrypted program using the third message $m_b$ to obtain an encrypted output value.

3. The method of claim 2, further comprising:

sending the encrypted output value to the sender device, wherein the sender device decrypts the encrypted output value using the third message $m_b$.

4. The method of claim 1, wherein the hash function His a random oracle.

5. The method of claim 1, wherein the sender device or the receiver device is a semi-honest adversary.

6. The method of claim 1, wherein the sender device or the receiver device is a malicious adversary.

7. The method of claim 6, further comprising:

computing a non-interactive zero-knowledge proof of knowledge (NIZKPOK) proof pf on the input value b and the first elliptic curve z, wherein the sender device verifies the NIZKPOK proof pf, wherein the NIZKPOK proof pf guarantees that the receiver device cannot change the input value b and the first elliptic curve z after computing the NIZKPOK proof pf.

8. The method of claim 1, wherein the common reference string $x_b$ is generated by a trusted authority such that none of the sender device and the receiver device can manipulate but has access to.

9. The method of claim 1, wherein the first elliptic curve z and the combined value are generated using an isogeny mapping operation.

10. A receiver device comprising:

one or more processors; and a computer readable medium coupled to the one or more processors and containing instructions that, when executed, cause the one or more processors to perform a method for performing a privacy-preserving multi-party computation, the method comprising:

storing an input value b;

obtaining a common reference string $x_b$;

sampling a first random isogeny map r using a generator G;

generating a first elliptic curve z using the first random isogeny map r and the common reference string $x_b$;

transmitting the first elliptic curve z to a sender device;

receiving, from the sender device, a second elliptic curve $y_0$, a third elliptic curve $y_1$, a first masked message $c_0$, and a second masked message $c_1$, wherein the first masked message $c_0$ is generated using a first message $m_0$, and wherein the second masked message $c_0$ is generated using a second message $m_1$;

generating a hash output using a hash function H that operates on a combined value of the first random isogeny map r and a fourth elliptic curve $y_b$, wherein the fourth elliptic curve $y_b$ is either the second elliptic curve $y_0$ or the third elliptic curve $y_1$ depending on the input value b; and generating a third message $m_b$ by combining a third masked message $c_b$ with the hash output using an invertible function, wherein the third message $m_b$, is either the first masked message $m_0$ or the second masked message $m_1$ depending on the input value b, and wherein third masked message $c_b$ is either the first masked message $c_0$ or the second masked message $c_1$ depending on the input value b.

11. The receiver device of claim 10, wherein the input value b that is to be used in executing an encrypted program, the method further comprising:

executing the encrypted program using the third message $m_b$ to obtain an encrypted output value.

12. The receiver device of claim 11, further comprising:

sending the encrypted output value to the sender device, wherein the sender device decrypts the encrypted output value using the third message $m_b$.

13. The receiver device of claim 10, wherein the hash function His a random oracle.

14. The receiver device of claim 10, wherein the sender device or the receiver device is a semi-honest adversary.

15. The receiver device of claim 10, wherein the sender device or the receiver device is a malicious adversary.

16. The receiver device of claim 15, further comprising:

computing a non-interactive zero-knowledge proof of knowledge (NIZKPOK) proof pf on the input value b and the first elliptic curve z, wherein the sender device verifies the NIZKPOK proof pf, wherein the NIZKPOK proof pf guarantees that the receiver device cannot change the input value b and the first elliptic curve z after computing the NIZKPOK proof pf.

17. The receiver device of claim 10, wherein the common reference string $x_b$ is generated by a trusted authority such that none of the sender device and the receiver device can manipulate but has access to.

18. The receiver device of claim 10, wherein the first elliptic curve z and the combined value are generated using an isogeny mapping operation.

\* \* \* \* \*